(12) United States Patent
Olarte

(10) Patent No.: US 7,478,876 B2
(45) Date of Patent: Jan. 20, 2009

(54) SEATING SYSTEM AND ASSEMBLY

(75) Inventor: Alvaro Mauricio Olarte, Aventura, FL (US)

(73) Assignee: Series International, LLC, Miami, FL (US)

( * ) Notice: Subject to any disclaimer, the term of this patent is extended or adjusted under 35 U.S.C. 154(b) by 528 days.

(21) Appl. No.: 10/991,847

(22) Filed: Nov. 18, 2004

(65) Prior Publication Data

US 2005/0168032 A1   Aug. 4, 2005

Related U.S. Application Data

(63) Continuation-in-part of application No. 10/756,743, filed on Jan. 13, 2004, now Pat. No. 7,204,553.

(51) Int. Cl.
*A47C 15/00* (2006.01)
(52) U.S. Cl. .................................. 297/248; 297/331
(58) Field of Classification Search ............. 297/331, 297/332, 333, 257, 248, 233
See application file for complete search history.

(56) References Cited

U.S. PATENT DOCUMENTS

| | | | |
|---|---|---|---|
| 3,300,246 A | 1/1967 | Bouche | |
| D221,642 S | 8/1971 | Bayes | |
| 3,762,765 A | 10/1973 | Piretti | |
| 3,785,600 A * | 1/1974 | Padovano | 248/188.1 |
| 3,796,459 A | 3/1974 | Weber | |
| 4,850,159 A | 7/1989 | Conner | |
| 4,989,915 A | 2/1991 | Hansal | |
| 5,306,072 A * | 4/1994 | Caldwell | 297/232 |
| 5,470,128 A | 11/1995 | Kerkham | |
| 5,845,964 A | 12/1998 | Phoon | |
| 5,890,761 A | 4/1999 | Miller | |
| 6,095,603 A | 8/2000 | Hock | |
| 6,296,315 B1 | 10/2001 | Jensen | |

FOREIGN PATENT DOCUMENTS

EP          0188002 A2 *   7/1986

* cited by examiner

*Primary Examiner*—Milton Nelson, Jr.
(74) *Attorney, Agent, or Firm*—St. Onge Steward Johnston & Reens LLC

(57) ABSTRACT

This invention relates specifically to a seating system or assembly which utilizes a modularized system of standard sized components. The system reduces manufacturing costs, simplifies storage and shipping and improves assembly efficiencies. The system of modularized components allows flexibility in seating use and design.

47 Claims, 32 Drawing Sheets

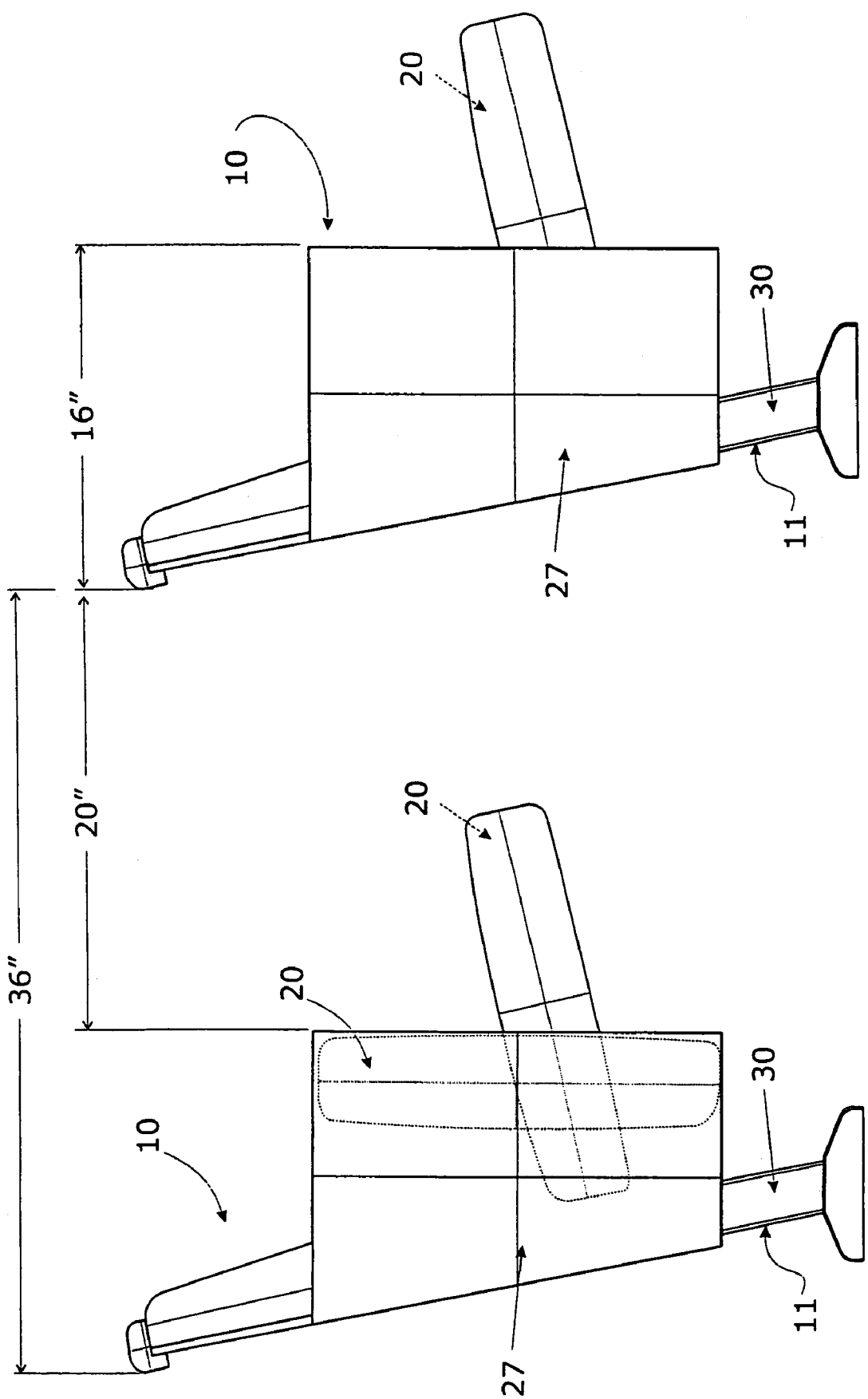

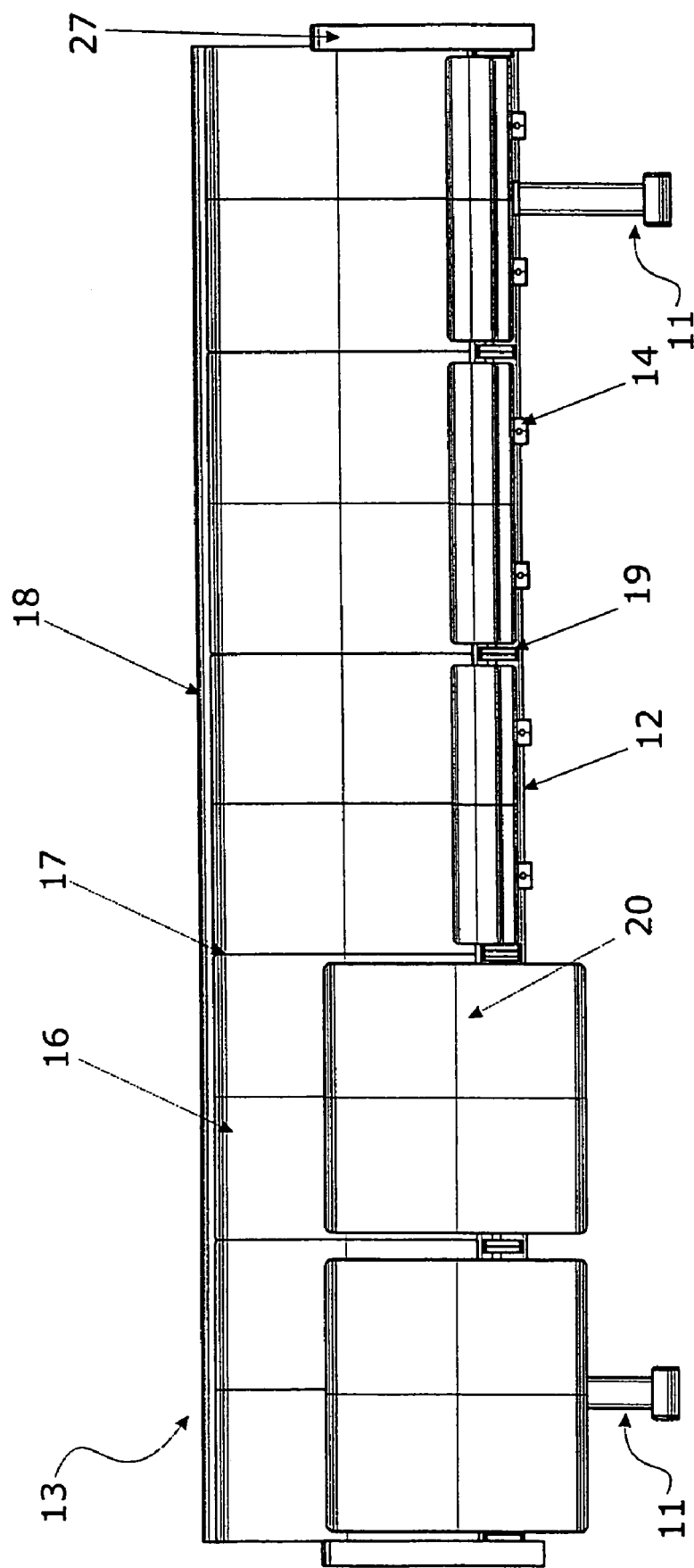

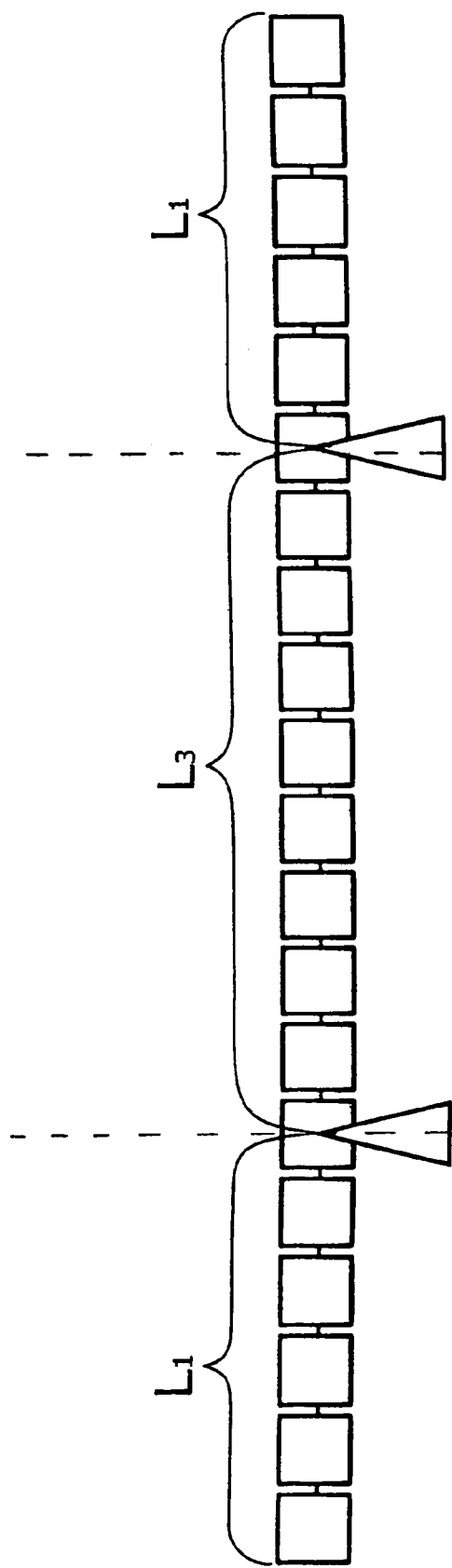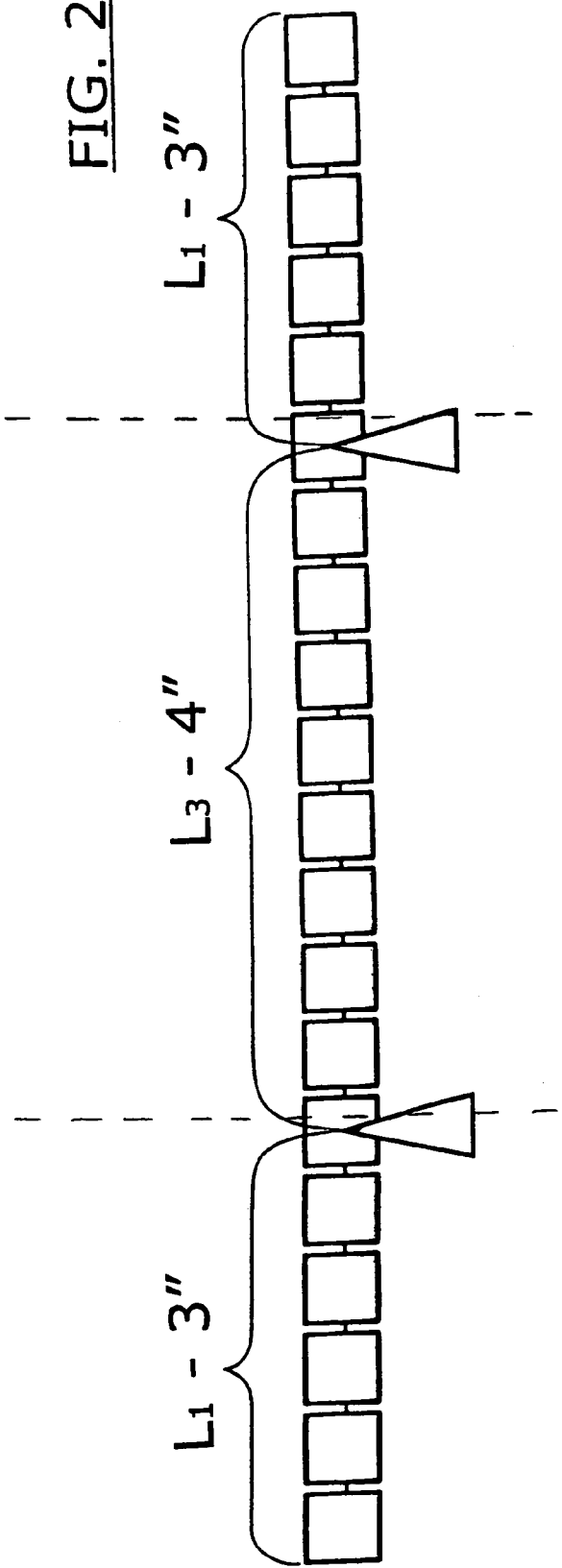

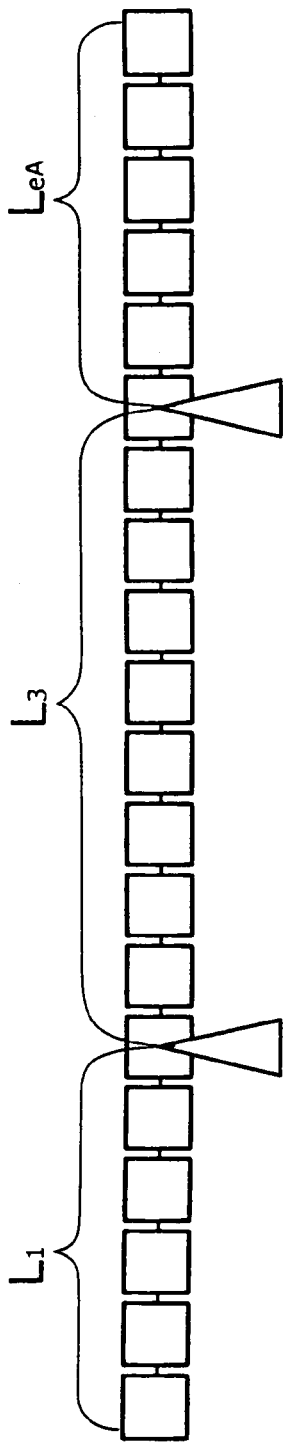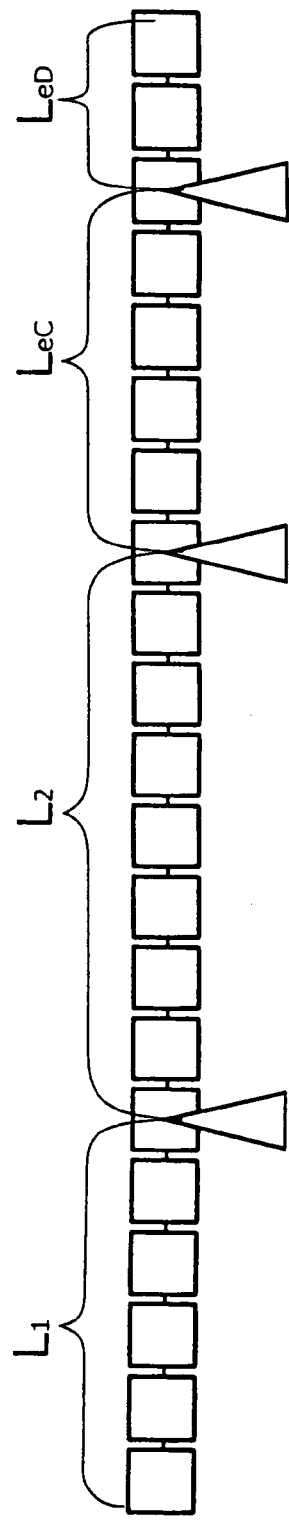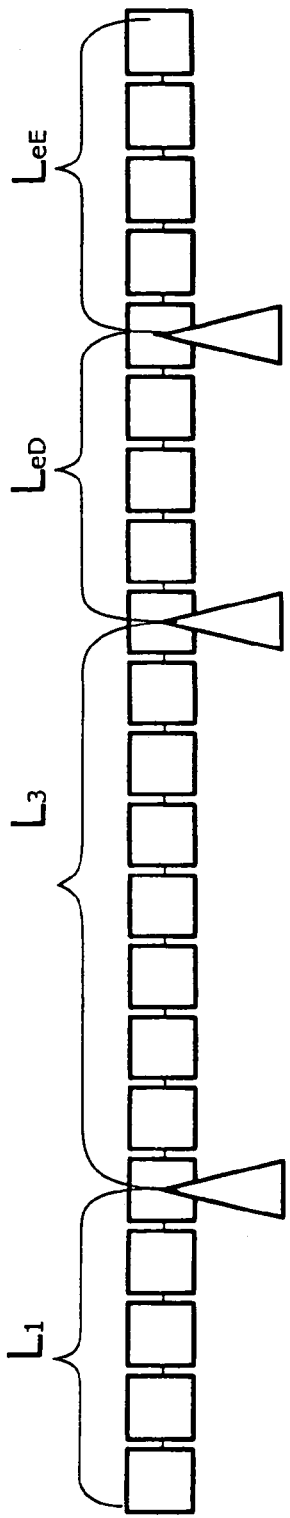

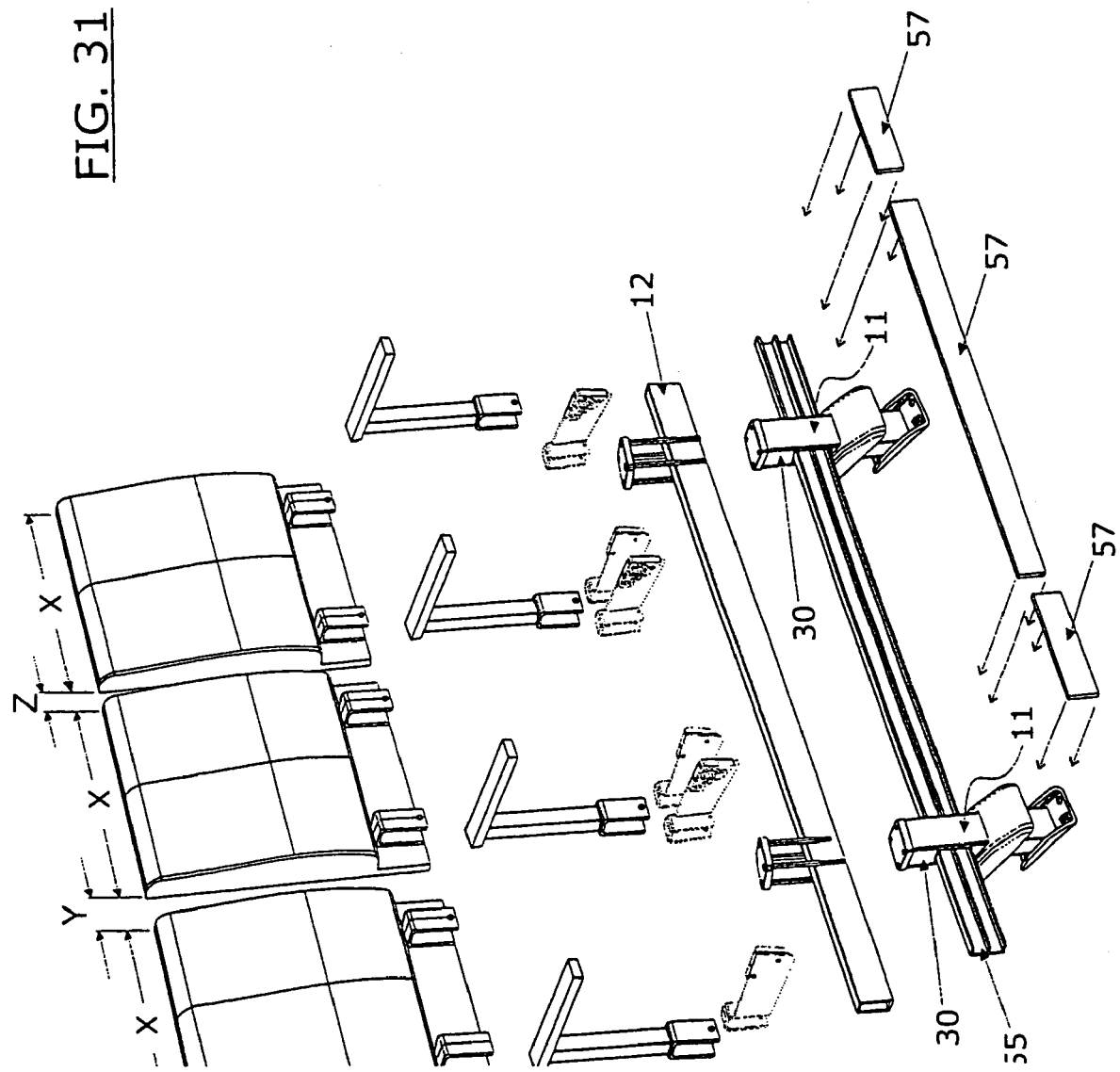

SEATING SYSTEM AND ASSEMBLY

PRIORITY DOCUMENT

This application is a continuation in part of and claims the benefit of the filing date of U.S. patent application Ser. No. 10/756,743 filed Jan. 13, 2004 now U.S. Pat. No. 7,204,553.

FIELD OF THE INVENTION

This invention relates generally to a seating system or assembly. This invention relates specifically to a seating system or assembly, which utilizes a modularized system of standardized parts to reduce costs and improve manufacturing and assembly efficiencies.

BACKGROUND OF THE INVENTION

Complexities involved in providing fixed seating in theaters, auditoriums or places of worship or extended seating in waiting areas such airports cause costly inefficiencies. Compromises in seating size and row length often must be made reducing flexibility in design. While current methods of customization for such seating result in reduced seating capacity, increased complication in assembly and installation, reduced flexibility in design, complexities in manufacturing, inventory and shipping processes, and difficulty in maintenance.

The present invention, by standardizing certain components and modularizing the assembly improves the inefficiencies inherent in current custom seating systems and assemblies. The system can be applied to all types of seating, whether fixed or not, including seating for theaters, auditoriums, places of worship, airports, classrooms and waiting areas, while maintaining all the functionality and aesthetics that current assemblies offer.

The present invention uses an assembly of beams, which are supported horizontally as the building block for the seating assembly. The beam assembly may have multiple beams of standard lengths, which are joined together to achieve the desired length of the seating assembly. The remaining components of the assembly are also of standardized sizes, including molded seats, individual seat backs and bottoms, any seat connection mechanisms, any armrests, cupholders or tablet arms, any decorative pieces, or any other envisioned seating assembly component, each of which may attach to the beam assembly through a modular assembly.

Each beam may have a rectangular cross section while the component assembly pieces connect with the beam assembly with U-shaped brackets. The U-shaped bracket surrounds the rectangular cross section beam assembly and withstands slippage as the component assembly pieces experience a torque. It is envisioned that each beam may be triangular, hexagonal, octagonal or other cross sectional shape and the component assembly pieces may have a correspondingly shaped attachment bracket to resist slippage due to torque. The beam made be steel or aluminum or any other material having suitable strength. The components can then be fixedly secured to the beam assembly. While self tapping screws can be used, preferably a nut and bolt or other fixation means may be employed such that the fixation can be accomplished without the need for welds or putting holes in the beam.

By utilizing standardized parts, the manufacturing of the assembly components is made simpler. Thousands of custom sized pieces do not need to be manufactured for each job order. In fact, many pieces of standard size are not even job specific. This also reduces the complexities associated with storage and inventory of component pieces. Because the major components are all the same size, similar components can all be stored together, and not separated by size or job order. Likewise, the parts need not be separated and itemized out for shipping to a job site. These benefits manifest themselves in lower costs.

Another place the present seating assembly invention can save costs is in the ease of assembly the system provides. An installer does not have to search through thousands of components, which must be specifically marked and designated for an exact location on a seating assembly for an exact location in a large auditorium. Rather, an installer can merely install and assemble the standard size components and modular pieces. Any necessary customization is done on site by the installer with little trouble.

A further benefit of minimal customization which can be done on site is greater flexibility in design. The seating assembly dimensions can be changed, the seating locations within the room can be moved and the seating assembly components can be reused. All this can happen on site and be done by the installer or even accomplished at a later date.

Furthermore, maintenance is easier and less costly as standardized components can be easily replaced. The components can simply be unscrewed and removed from the beam, and replacement standardized parts are easily obtained.

The present invention may be applied to various types of seating having customized appearance while still maintaining the benefits of the modular seating system. The specific advantages of applying the seating system and assembly to a pew or bench are described in greater detail in a copending application.

SUMMARY OF THE INVENTION

Accordingly, it is an object of the present invention to provide a seating assembly with modularized seating components allowing the seating assembly to be constructed to any desired width without requiring customized construction or components.

Another object of the present invention is to provide a seating assembly with standardized sized seating components attached to a beam assembly without welds.

A further of the present invention is to provide a seating assembly with greater seating capacity offering lower seating costs and lower construction costs.

Another further object of the present invention is to provide a seating assembly, which in an up-position provides an increased egress, compared to a traditional pew or a theater seat allowing for longer rows, fewer aisles, and greater overall traffic flow.

Still another object of the present invention is to provide a seating assembly with a design that allows for row lengths to be adjusted by on the job site by interchanging seat sizes or by adjusting the space between the seats.

Yet another object of the present invention is to provide a seating assembly that simplifies inventory and installation.

These and other objects of the present invention are achieved by provision of a row of seating of a predetermined length having a beam assembly with a plurality of beams aligned end to end, at least a first of the plurality of beams having a first standard length selected from a plurality of predefined standard lengths, and at least a second of the plurality of beams having a second standard length selected from the plurality of predefined standard lengths, where the first standard length is not the same as the second standard length. A plurality of supports support the beam assembly in a substantially horizontal position and a plurality of seating components are attached to the beam assembly.

It is preferable that the row of seating has a plurality of seating components comprising a plurality of seat assemblies with an optimal seat width and the first standard length and the second standard length comprise integer multiples of one half of the optimal seat width. Preferably, first standard length and the second standard length comprise odd integer multiples of one half of the optimal seat width. The plurality of beams further have at least one cut beam, and where a sum of lengths of the plurality of beams corresponds to the predetermined length of the row of seating. The cut beam is cut from a beam having a length selected from the plurality of standard lengths. The cut beam having a length which is an integer multiple of one half of the optimal seat width and preferably the cut beam length is an odd integer multiple of one half of the optimal seat width.

A row of seating, where the cut beam is cut from a beam having a length selected from the plurality of standard lengths, has a cut beam of a custom length such that the beam assembly reaches the predetermined length of the row of seating without requiring customization of all of the plurality of beams. The cut beam is cut from a beam having the first standard length or the second standard length.

In some embodiments, the row of seating may have a third of the plurality of beams with a third standard length selected from the plurality of predefined standard lengths, where the third standard length is different than the first standard length and the second standard length.

It is preferable that the beam assembly is secured to the supports such that the beam assembly is positioned between a first and second plate and secured by screws passing outside the beam assembly connecting the first and second plates. Preferably, the first plate of each support is an upper plate and the second plate of each support is a lower plate and the beam assembly is positioned between the upper plate and the lower plate of each support and screws extend from the upper plate to the lower plate to secure the beam assembly to the supports.

In an embodiment where the beam assembly has a substantially rectangular cross section, the first and second plates of each support may comprise a U-shaped bracket, an opening of the U-shaped bracket corresponding to a thickness of the beam assembly. The beam assembly may be positioned such that the U-shaped bracket substantially surrounds the beam assembly on three sides. At least some of the seat components are connected to the beam assembly by U-shaped brackets, each U-shaped bracket being fixedly secured to the beam assembly by screws passing through the U-shaped bracket and beside the beam assembly such that no holes are made in the beam assembly.

Also, where the beam assembly has a substantially rectangular cross section and each of the plurality of seating components has a substantially U-shaped bracket, an opening of the U-shaped bracket corresponds to a thickness of the beam assembly, and is positioned such that the U-shaped bracket substantially surrounds the beam assembly on three sides.

Preferably, the plurality of seating components have a plurality of seat backs and a plurality of corresponding seat bottoms and a plurality of seat connectors connect the plurality of seating components to the beam assembly. Each of the plurality of seat connectors has a substantially U-shaped bracket, an opening of the U-shaped bracket corresponding to the thickness of the beam assembly, and is positioned such that the U-shaped bracket substantially surrounds the beam assembly on three sides. It is preferable that the plurality of seating components comprise a plurality of separate seat bottoms and seat backs and where the plurality of seat bottoms are attached to the beam assembly through the plurality of seat connectors.

Left and right seat connectors are preferably connected to the said beam assembly and positioned such that a left seat connector attaches to the left side of a seat bottom and a right seat connector attaches to a right side of a seat bottom, defining a space between adjacent seat bottoms. The space between adjacent seat bottoms can be adjusted shifting at least one of the left or right seat connectors along said beam assembly so that the row of seating reaches a predetermined length without requiring customization of the plurality of seating components.

It is also preferable that the plurality of seat connectors extend forward in a substantially horizontal position and a plurality of seat bottoms are pivotably attached to the plurality of seat connectors, each of the plurality of seat bottoms being separately pivotable about an axis through the plurality of seat connectors. The plurality of seat connectors is configured such that the plurality of seat bottoms are gravity lifted. Preferably, each of the plurality of seat connectors has a saddle bracket portion having an inner pivot channel, a pin portion having a pin protruding therefrom, and where, when the pin portion is angled with respect to the saddle bracket portion at an insertion angle, the pin is insertable into and removable from the inner pivot channel, and such that when the pin portion is angled with respect to the saddle bracket portion at an angle other than the insertion angle, the pin is retained in the inner pivot channel.

It is most preferable that the plurality of seating components has a plurality of seat bottoms, and where the plurality of seat bottoms outnumber the plurality of supports and that the plurality of supports is positioned substantially beneath at least one of the plurality of seat bottoms. At least some of the plurality of seat components are connected to the beam assembly by way of U-shaped brackets, each U-shaped bracket being fixedly secured to the beam assembly by a plate fastened to the U-shaped bracket such that the beam assembly is surrounded by the U-shaped bracket and the plate is fastened to the U-shaped bracket with screws, such that no holes are made in the beam assembly. Also, at least some of the plurality of supports are connected to the beam assembly by way of U-shaped brackets, each U-shaped bracket being fixedly secured to the beam assembly by a plate fastened to the U-shaped bracket such that the beam assembly is surrounded by the U-shaped bracket and the plate is fastened to the U-shaped bracket with screws, such that no holes are made in the beam assembly.

In certain embodiments, the seating components comprise a plurality of arm rests and at least some of the plurality of arm rests comprises end members attached to ends of the beam assembly to define the predetermined length of the row of seating. Also, at least some of the plurality of arm rests are connected to the beam assembly by seating connectors, where each of the seating connectors has a substantially U-shaped bracket, an opening of the U-shaped bracket corresponding to a thickness of the beam assembly, and positioned such that the U-shaped bracket substantially surrounds the beam assembly on three sides. Some of the plurality of arm rests are integral with the seating connectors.

The objects of the present invention are further achieved by provision of a seating arrangement having at least a first row of seating and a second row of seating, the first row of seating having a different length than the second row of seating. The first row of seating has a first plurality of beams aligned end to end and supported in a substantially horizontal position. At least one of the first plurality of beams having a first length and at least another of the first plurality of beams having a second length different than the first length such that a combined length of the first plurality of beams defines a length of the first row of seating. The second row of seating has a second plurality of beams aligned end to end and supported in a substantially horizontal position, at least one of the second plurality of beams having a third length and at least another of the second plurality of beams having a fourth length different than the third length, such that a combined length of the second plurality of beams defines a length of the second row of seating. A first plurality of seats connects to the first plurality of beams, at least some of the first plurality of seats having a first standard width, a combined width of the first plurality of seats being generally equal to the length of the first row of seating. A second plurality of seats connects to the second plurality of beams, at least some of the second plurality of seats having a first standard width, a combined width of the second plurality of seats being generally equal to the length of the second row of seating.

In some embodiments, the first length is the same as the third length and the second length is the same as the fourth length. The first length, the second length, the third length and the fourth length comprise integer multiples of one half of the first standard width of the first plurality of seats and the second plurality of seats. Preferably, the first length, the second length, the third length and the fourth length comprise odd integer multiples of one half of the first standard width of the first plurality of seats and the second plurality of seats.

It is preferable that at least some of the first plurality of seats and the second plurality of seats comprise a seat having a second standard width, selected from a group standard widths, such that the combined width of the first plurality of seats is generally equal to the length of the first row of seating and the combined width of the second plurality of seats is generally equal to the length of the second row of seating without requiring custom width seats. Preferably, the first plurality of beams and the second plurality of beams have a substantially rectangular cross section and each of the first plurality of seats and the second plurality of seats have a substantially U-shaped bracket, an opening of the U-shaped bracket corresponding to a thickness of the first plurality of beams and the second plurality of beams, positioned such that the U-shaped bracket substantially surrounds the first plurality of beams or the second plurality of beams on three sides.

It is preferable that a plurality of seat connectors connect the first plurality of seats and the second plurality of seats to the first plurality of beams or the second plurality of beams, each of the plurality of seat connectors having a substantially U-shaped bracket, an opening of the U-shaped bracket corresponding to a thickness of the first plurality of beams and the second plurality of beams, positioned such that the U-shaped bracket substantially surrounds the first plurality of beams or the second plurality of beams on three sides. Preferably, the first plurality of seats and the second plurality of seats comprise a plurality of seat bottoms and a corresponding plurality of seat backs, and the plurality of seat connectors connect the plurality of seat bottoms to the first plurality of beams and the second plurality of beams.

It is most preferable that the plurality of seat connectors extend forward in a substantially horizontal position and the plurality of seat bottoms are pivotably attached to the plurality of seat connectors, each of the plurality of seat bottoms being separately pivotable about an axis through the plurality of seat connectors. The plurality of seat connectors are configured such that the plurality of seat bottoms are gravity lifted where each of the plurality of seat connectors has a saddle bracket portion having an inner pivot channel, a pin portion having a pin protruding therefrom, and where, when the pin portion is angled with respect to the saddle bracket portion at an insertion angle, the pin is insertable into and removable from the inner pivot channel, and such that when the pin portion is angled with respect to the saddle bracket portion at an angle other than the insertion angle, the pin is retained in the inner pivot channel.

At least some of the first plurality of seats and the second plurality of seats are connected to the first beams or the second beams by U-shaped brackets. Each U-shaped bracket may be fixedly secured to the first or second beams where the first or second beams are substantially surrounded on three sides by the U-shaped bracket. At least one screw which passes through the U-shaped bracket and beside the first or second beam to secure the beam within the U-shaped bracket, such that no holes are made in the beams.

Preferably, the first length, the second length, the third length and the fourth length are selected from a plurality of predefined standard lengths. The first plurality of beams further has a first cut beam and where the second plurality of beams further has a second cut beam. The first cut beam and the second cut beam are cut from beams having lengths selected from the plurality of predefined standard lengths.

The objects of the present invention are further achieved by provision of a method of assembling a row of seating having a predetermined row length, having the steps of selecting a first beam with a first standard length from a plurality of beams having a plurality of predefined standard lengths, and selecting a second beam with a second standard length from the plurality of beams having the plurality of predefined standard lengths, the first standard length being different than the second standard length. Next, aligning end to end the first beam and the second beam to form a beam assembly, and supporting the beam assembly in a substantially horizontal position with a plurality of supports, and then attaching a plurality of seating components to the beam assembly. Also, a plurality of seat assemblies having an optimal seat width is selected.

It is preferable that that the step of selecting a first beam includes the step of selecting a first beam with a first standard length which is an integer multiple of one half of the optimal seat width, and where the selecting a second beam step includes the step of selecting a second beam with a second standard length which is an integer multiple of one half of the optimal seat width. Preferably the selecting a first beam step includes the step of selecting a first beam with a first standard length which is an odd integer multiple of one half of the optimal seat width, and the selecting a second beam step includes the step of selecting a second beam with a second standard length which is an odd integer multiple of one half of the optimal seat width.

The method further provides the steps of cutting at least one cut beam having a cut beam length, and the aligning step includes the step of aligning end to end the first beam, the second beam and the cut beam to form a beam assembly having a beam assembly length corresponding to a sum of the first standard length, the second standard length and the cut beam length, where the beam assembly length corresponds to the predetermined row length.

It is also preferable that that the step of cutting at least one cut beam includes the step of cutting at least one cut beam with a cut beam length from a beam having a length selected from the plurality of standard lengths, the cut beam length being an integer multiple of one half of the optimal seat width. Preferably, the cut beam length is an odd integer multiple of one half of the optimal seat width. The step of cutting at least one cut beam includes the step of cutting at least one cut beam with a cut beam length from a beam having a length selected from the plurality of standard lengths. The cut beam length having a custom length such the beam assembly reaches the predetermined row length without requiring customization of all beams forming the beam assembly and where the cut beam is cut from a beam having the first standard length or the second standard length. The method further provides the step of selecting a third beam with a third standard length from the plurality of beams from the plurality of predefined standard lengths, the third standard length being different than the first standard length and the second standard length. The aligning step includes the step of aligning end to end the first beam, the second beam and the third beam to form a beam assembly.

The objects of the present invention are further achieved by provision of a method of providing a seating arrangement having the steps of specifying a desired first row length of a first row of seating, specifying a desired second row length of a second row of seating, the first length being different than the second length. The first row of seating is formed with a first plurality of beams aligned end to end and supported in a substantially horizontal position, at least one of the first plurality of beams having a first length and at least another of the first plurality of beams having a second length different than the first length. The first length and the second length are selected such that a combined length of the first plurality of beams is generally equal to the desired first row length. The method further provides for forming the second row of seating with a second plurality of beams aligned end to end and supported in a substantially horizontal position, at least one of the second plurality of beams having a third length and at least another of the second plurality of beams having a fourth length different than the third length. The third length and the fourth length are selected such that a combined length of the second plurality of beams is generally equal to the desired second row length. A first plurality of seats are connected to the first plurality of beams, and at least some of the first plurality of seats have a first standard width, and a combined width of the first plurality of seats being generally equal to the desired first row length. Also, a second plurality of seats are connected to the second plurality of beams, and at least some of the second plurality of seats have a first standard width, a combined width of the second plurality of seats being generally equal to the desired second row length.

It is preferable that the first length is the same as the third length and the second length is the same as the fourth length. Also, the first length, the second length, the third length and the fourth length comprise integer multiples of one half of the first standard width of the first plurality of seats and the second plurality of seats. Preferably, the first length, the second length, the third length and the fourth length comprise odd integer multiples of one half of the first standard width of the first plurality of seats and the second plurality of seats.

At least some of the first plurality of seats and the second plurality of seats comprise a seat having a second standard width, selected from a group standard widths, such that the combined width of the first plurality of seats is generally equal to the desired first row length and the combined width of the second plurality of seats is generally equal to the desired second row length without requiring custom width seats, where the first length, the second length, the third length and the fourth length are selected from a plurality of predefined standard lengths.

It is also preferable that that the step of forming the first row of seating includes the step of cutting a first cut beam and where the first plurality of beams further includes the first cut beam, and the forming the second row of seating includes the step of cutting a second cut beam and where the second plurality of beams further includes the second cut beam. It is further preferable that that the step of cutting a first cut beam includes the step of cutting a first cut beam from a beam with a length selected from the plurality of predefined standard lengths, and where the cutting a second cut beam includes the step of cutting a second cut beam from a beam with a length selected from the plurality of predefined standard lengths.

Preferably, the step of specifying a desired first row length includes the step of receiving a specification of a desired first row length from a customer, and where the step of specifying a desired second row length includes the step of receiving a specification of a desired second row length from the customer. An automated basis for receiving the specification of a desired first row length from a customer and the specification of a desired second row length from the customer is provided. Preferably, the step of providing an automated basis includes the step of providing a network connection for receiving the specification of a desired first row length from a customer and the specification of a desired second row length from the customer.

The objects of the present invention are further achieved by provision of a method of assembling a row of seating having a predetermined row length, aligning at least two beams from a plurality of beams having at least two predefined standard lengths end to end to form a beam assembly such that the predetermined row length is reached and supporting the beam assembly in a substantially horizontal position with a plurality of supports. Seating components of a standard size comprising a plurality of seat bottoms are selected and a number of left seat connectors equal to the number of selected seat bottoms and a number of right seat connectors equal to the number of selected seat bottoms are attached to the beam assembly such that a left seat connector is positioned to attach to a left side of a seat bottom and a right seat connector is positioned to attach to a right side of a seat bottom. The method provided for defining a space between adjacent seat bottoms and adjusting the space between adjacent seat bottoms by shifting at least one of the left and right seat connectors along said beam assembly so that the row of seating reaches the predetermined length without requiring customization of the plurality of seating components.

The method further provided for extending the left and right seat connectors forward in a substantially horizontal position and pivotably attaching the plurality of seat bottoms to the left and right of seat connectors, each of the plurality of seat bottoms being separately pivotable about an axis through the seat connectors.

The left and right seat connectors are preferably configured so that the seat bottoms are gravity lifted by provision of a saddle bracket portion comprising an inner pivot channel, a pin portion comprising a pin protruding therefrom so that when the pin portion is angled with respect to the saddle bracket portion at an insertion angle, the pin is insertable into and removable from the inner pivot channel, and such that when the pin portion is angled with respect to the saddle bracket portion at an angle other than the insertion angle, the pin is retained in the inner pivot channel.

The objects of the present invention are further achieved by provision of a method for facilitating the assembly of seating arrangements, the method having the steps of receiving an indication of a desired row configuration for at least one seating row, inputting the desired row configuration into a computer executable algorithm, and determining, with the computer executable algorithm, a number of beams and corresponding beam sizes which correspond to the desired row configuration. The method further provided for determining with the computer executable algorithm the number of seating components and corresponding seating component sizes which correspond to the desired row configuration. The number of beams and corresponding beam sizes, which correspond to the desired row configuration and the number of seating components and corresponding seating component sizes, which correspond to the desired row configuration, are shipped to a site for assembly.

It is preferable that the step of receiving an indication of a desired row configuration for at least one seating row includes the step of receiving, via a networked communications link, an indication of a desired row configuration for at least one seating row. Preferably, the networked communications link comprises the Internet. Further, a plurality of beams having a plurality of predefined standard lengths are inventoried.

It is also preferable that that the step of determining with the computer executable algorithm the number of beams and corresponding beam sizes which correspond to the desired row configuration includes the step of selecting a first beam with a first standard length from the plurality of beams comprising the plurality of predefined standard lengths, and selecting a second beam with a second standard length from the plurality of beams comprising the plurality of predefined standard lengths, where the first standard length being different than the second standard length. Preferably, the step of determining with the computer executable algorithm the number of seating components and corresponding seating component sizes which correspond to the desired row configuration includes the step of selecting a plurality of seat assemblies having an optimal seat width.

It is further preferable that that the step of selecting a first beam includes the step of selecting a first beam with a first standard length which is an integer multiple of one half of the optimal seat width, and where the selecting a second beam step includes the step of selecting a second beam with a second standard length which is an integer multiple of one half of the optimal seat width. Preferably, the selecting a first beam step includes the step of selecting a first beam with a first standard length which is an odd integer multiple of one half of the optimal seat width, and where the selecting a second beam step includes the step of selecting a second beam with a second standard length which is an odd integer multiple of one half of the optimal seat width.

It is also preferable that that the step of determining with the computer executable algorithm the number of beams and corresponding beam sizes which correspond to the desired row configuration further includes the step of selecting a third beam with a third standard length from the plurality of beams comprising the plurality of predefined standard lengths. The third standard length is different than the first standard length and the second standard length.

It is further preferable that that the step of determining with the computer executable algorithm the number of beams and corresponding beam sizes which correspond to the desired row configuration includes the step of selecting a first beam with a first standard length from the plurality of beams comprising the plurality of predefined standard lengths, selecting a second beam with a second standard length from the plurality of beams comprising the plurality of predefined standard lengths, where the first standard length is different than the second standard length. The method further provides determining a target cut beam length, and selecting a beam to be cut to the target cut beam length from the plurality of beams having the plurality of predefined standard lengths. It is preferable that that the beam to be cut to the target cut beam length is chosen from the first standard length or the second standard length.

It is also preferable that the step of receiving an indication of a desired row configuration for at least one seating row includes the step of receiving an indication of a desired row configuration for a plurality of seating rows. Further the number of beams and corresponding beam sizes which correspond to the desired row configuration and the number of seating components and corresponding seating component sizes which correspond to the desired row configuration are bundled together separately for each of the plurality of seating rows.

The objects of the present invention are further achieved by provision of a method for facilitating assembly a row of seating, comprising the steps of inventorying a plurality of first beams with a first beam length and inventorying a plurality of second beams with a second beam length, where the second beam length is different than the first beam length. The method further provides receiving an indication of a target row length and determining a number of the plurality of first beams and determining a number of the plurality of second beams based upon the target row length. Then the determined number of the plurality of first beams and the determined number of the plurality of second beams are removed from inventory and shipped to a site for assembly.

The invention and its particular features and advantages will become more apparent from the following detailed description considered with reference to the accompanying drawings.

BRIEF DESCRIPTION OF THE DRAWINGS

FIG. 3 is a plan side view of the seating assembly of FIG. 1 showing two rows of seating assemblies.

FIG. 4 is a plan front view of the seating assembly of FIG. 1.

FIGS. 25a-b are schematics of combinations of beams used in the seating assembly illustrated in FIG. 1.

FIGS. 26a-c are schematics of combinations of beams used in the seating assembly illustrated in FIG. 1.

FIG. 31 is a perspective view of an embodiment of the seating assembly illustrated in FIG. 1 illustrating a conduit for wiring and cabling.

DETAILED DESCRIPTION OF THE DRAWINGS

Figure 1:
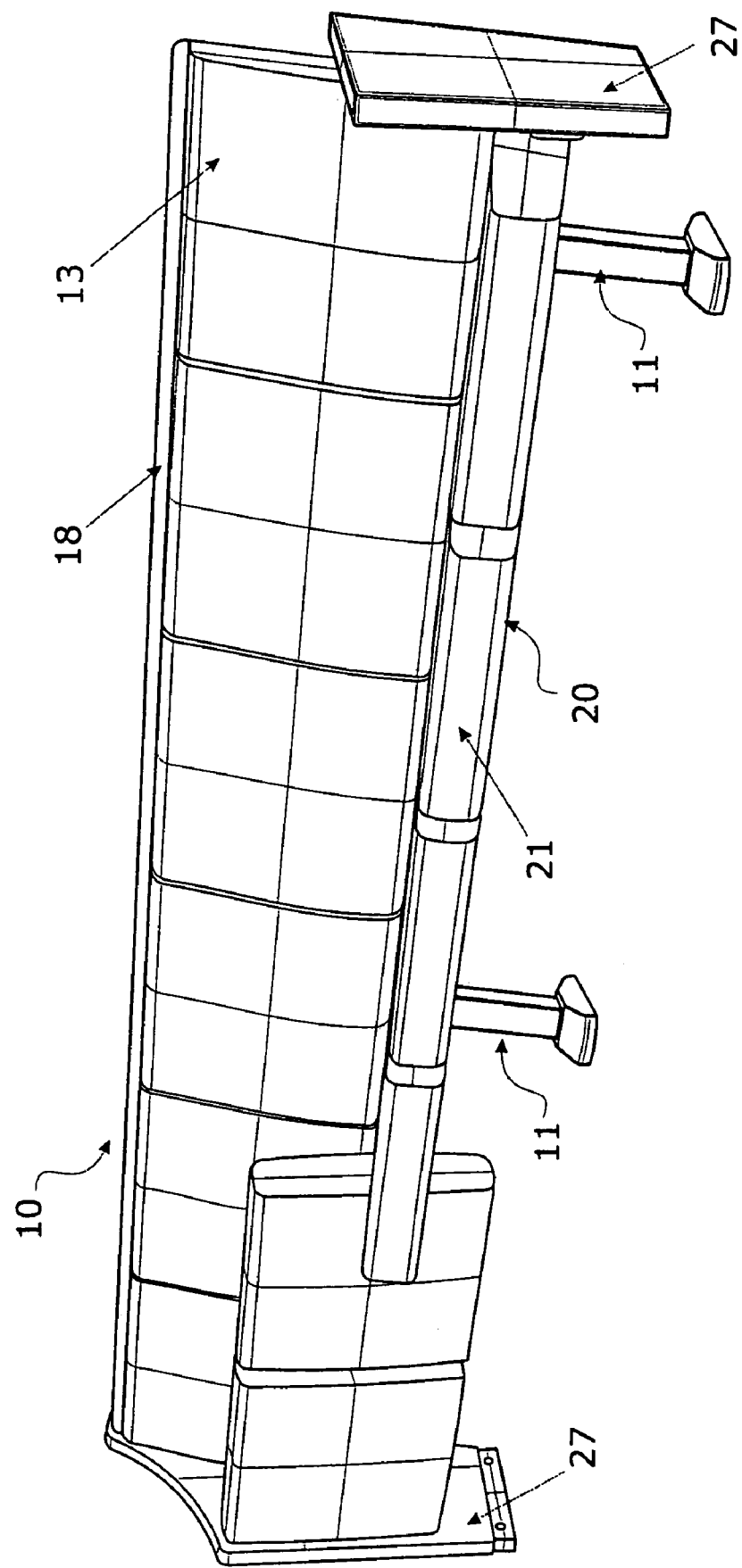
FIG. 1 is a perspective view of a seating assembly in accordance with an embodiment of the present invention showing seats in both the upright and occupied positions having modularized seat back assemblies.

The seating assembly of the present invention is referred to generally as 10. Referring to FIGS. 1-5, a beam 12 is supported in a substantially horizontal position by at least one base member 11. Preferably, the beam is supported by base members situated at intervals along the beam 12. The bases may be secured to the floor or to the riser in a step or may be free standing. The beam 12 preferably has a rectangular cross section of a known thickness T as illustrated in FIG. 5. Each seating assembly makes up a row of seats for a theater, auditorium, stadium, place of worship or classroom. Each row of seating has a predetermined length and beam assemblies are formed from aligning end to end a plurality of beams to reach that predetermined length. The base members support the beam assembly, but also withstand the forces and resultant torque from the weight of the seat users. These are forces are increased when more than one seat occupant stands or sits simultaneously.

A base member may have a lower pedestal 30 and an upper section which may hold the beam. The upper section may be a U-shaped bracket 29 as described below with the connection of other seating components to the beam assembly of the seating assembly. The opening of the U-shaped bracket 29 may be slightly wider than the thickness of the beam so that the beam may rest within the bracket. The base member 11 may be designed so that the U-shaped bracket 29 is positioned so that the lower portion of the bracket is below the top of the pedestal 30 to give the bracket greater support. The interaction of the bracket with the rectangular cross sectioned beam prevents the beam from slipping out of position if it is subjected to a torque. The beam 12 may be secured within the U-shaped brackets 29 with self bolts or screws. As shown in FIG. 5b, an upper plate 40 may be positioned over the beam 12 above the bracket 29 secured to the bracket by screws or bolts 41 to secure the beam in the bracket. This way, an installer avoids putting holes in the beam.

Figure 5A:
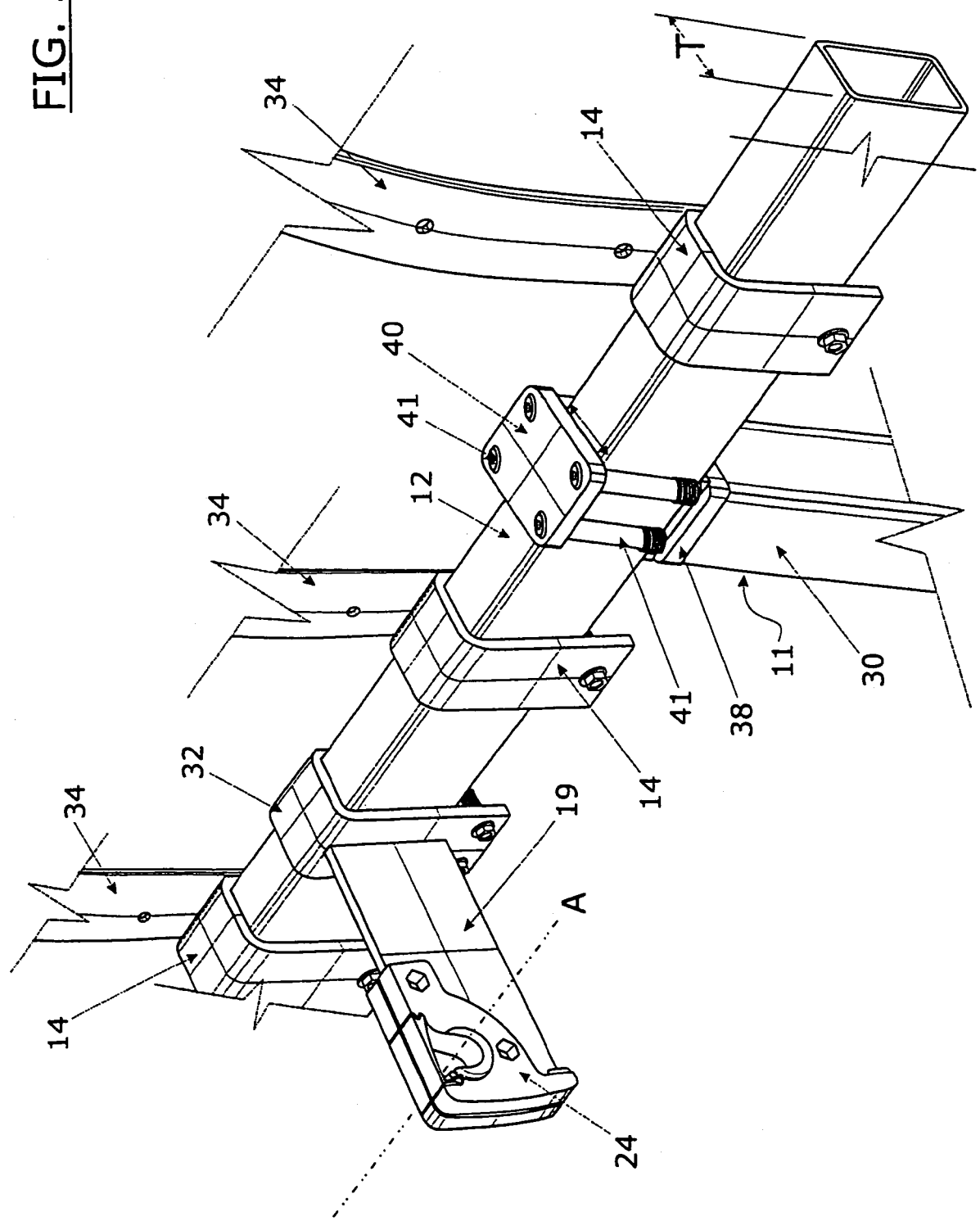
FIGS. 5a and 5b are enlarged perspective views of beam assemblies used in the seating assembly illustrated in FIG. 1.
Figure 5B:
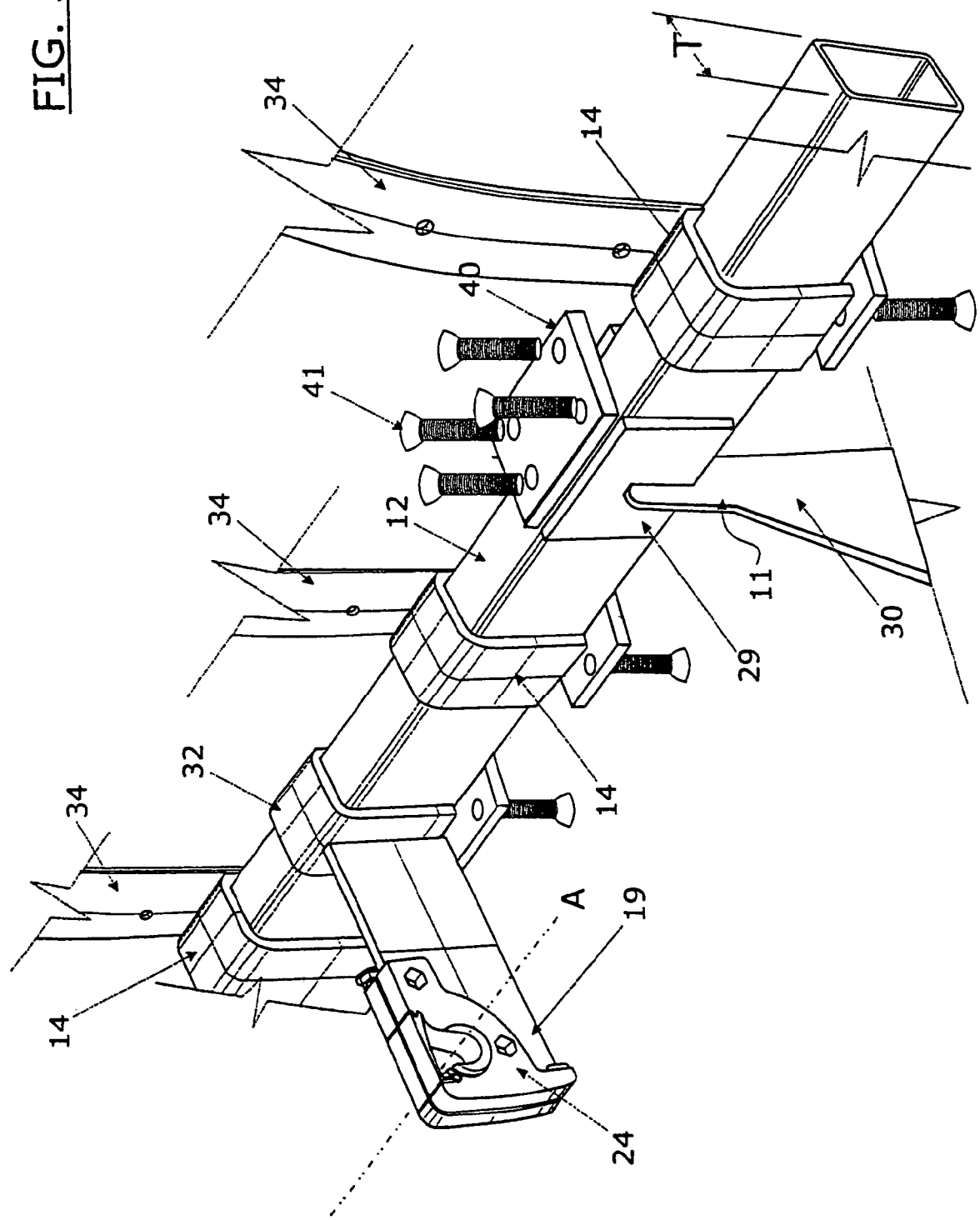

An another embodiment of a base member 11, as illustrated in FIG. 5a, the pedestal 30 of the base with include a plate 38 which is positioned on the pedestal 30 which the beam 12 will rest on. The pedestal 30 may be a steel pipe or other material or structure. The pedestal should be of appropriate dimension and strength to support the beam assembly and seat occupants. The plate 38 may be integral with the pedestal 30 and may be welded in position. Where the pedestal is a hollow pipe, the plate should be a thickness and be of a material of sufficient strength to withstand the forces and torque applied during use of the seating assembly. The plate 30 may have a width greater than the thickness of the beam to allow space on the plate for a means of holding the beams and securing it to the base member.

In a preferred embodiment of a base, after the beam is placed on the plate 38 of the pedestal 30, an upper plate 40 may be placed over the beam 12 and above the pedestal plate 38. Bolts or screws 41 may pass through holes in the upper plate 40, passed the front and the back of the beam 12, into threaded holes in the pedestal plate 38, securing the beam assembly to the base 11.

The base members 11 can be positioned under the seats, rather than placed between the seats, as done in the prior art. Supporting the beam under the seats increases placement tolerances to two or three inches as opposed to the prior art tolerances of fractions of an inch when placed between the seats. This feature is further useful in allowing flexibility in case of minor changes in desired seat widths or bench lengths. The use of the plate and screw designs described above rather than welds allows for easy repositioning of base members in the case of a design change.

At least one seat back assembly can be fixedly secured to the beam 12. The seat back assembly 13 may be secured by a U-shaped bracket 14. FIGS. 1-4 illustrate a seating assembly using a plurality of seat back assemblies 13. Extending substantially upwardly from the U-shaped bracket 14 is a seat back assembly support 34. In addition to the U-shaped bracket, which fixes and interacts with the beam, each seat back assembly may include a back support 15 and a back pad 16. The back pad 16 may be removable. The removable back pad provides a simple means of customization. Further, replacing a back pad is a cost effective maintenance means.

The opening of the U-shaped bracket 14 is slightly wider than the thickness of the beam 12. In this case, the U-shaped bracket 14 is positioned upside down, and slid over the beam, surrounding the beam on three sides so that the seat back assembly is fixedly secured to the beam. Further, the interaction of the bracket with the rectangular cross sectioned beam ensures that the seat back assembly will not slip out of position if it is subjected to a torque. Screws may be used to secure the bracket to the beam or the plate and bolt design may be employed. In a preferred embodiment, the U-shaped bracket 14 will extend past the beam so that a bolt or screw could pass through both sides of the bracket to secure the bracket to the beam without putting hole in the beam.

In addition, each back support 15 of the seat back assemblies may have a groove 33 along each edge that is adjacent to another seat back assembly. Back connector inserts 17 may be slid into these grooves 33 between the back supports 15 for aesthetic reasons, to define seating areas, and for support of the seat back assemblies. Also, a top member 18 may be fitted across the entire width of the seat back assemblies 13 for aesthetic reasons or to align the plurality of seat back assemblies 13 depending on the type of seating. These top members may also be of standardized length.

Seat connection mechanisms 19 are also fixed to the beam 12. Each seat connection mechanism includes a connector support 24 which extends forward in a substantially horizontal position and includes a connector support 24 on one end and a U-shaped seat connection mechanism bracket 32 on the other. Here also, the opening of the U-shaped bracket 32 may be slightly wider than the thickness of the beam 12. As with the seat back bracket 14, the seat connection mechanism bracket 32 is positioned upside down, and slid over the beam, surrounding the beam on three sides. The interaction of the bracket with the rectangular cross sectioned beam ensures that the seat back assembly will not slip out of position if it is subjected to a torque. Screws may be used to secure the bracket 32 to the beam 12 or the plate and bolt design may be employed. In a preferred embodiment, the U-shaped bracket 32 will extend past the beam so that a bolt or screw could pass through both sides of the bracket to secure the bracket to the beam without putting hole in the beam.

Figure 20:
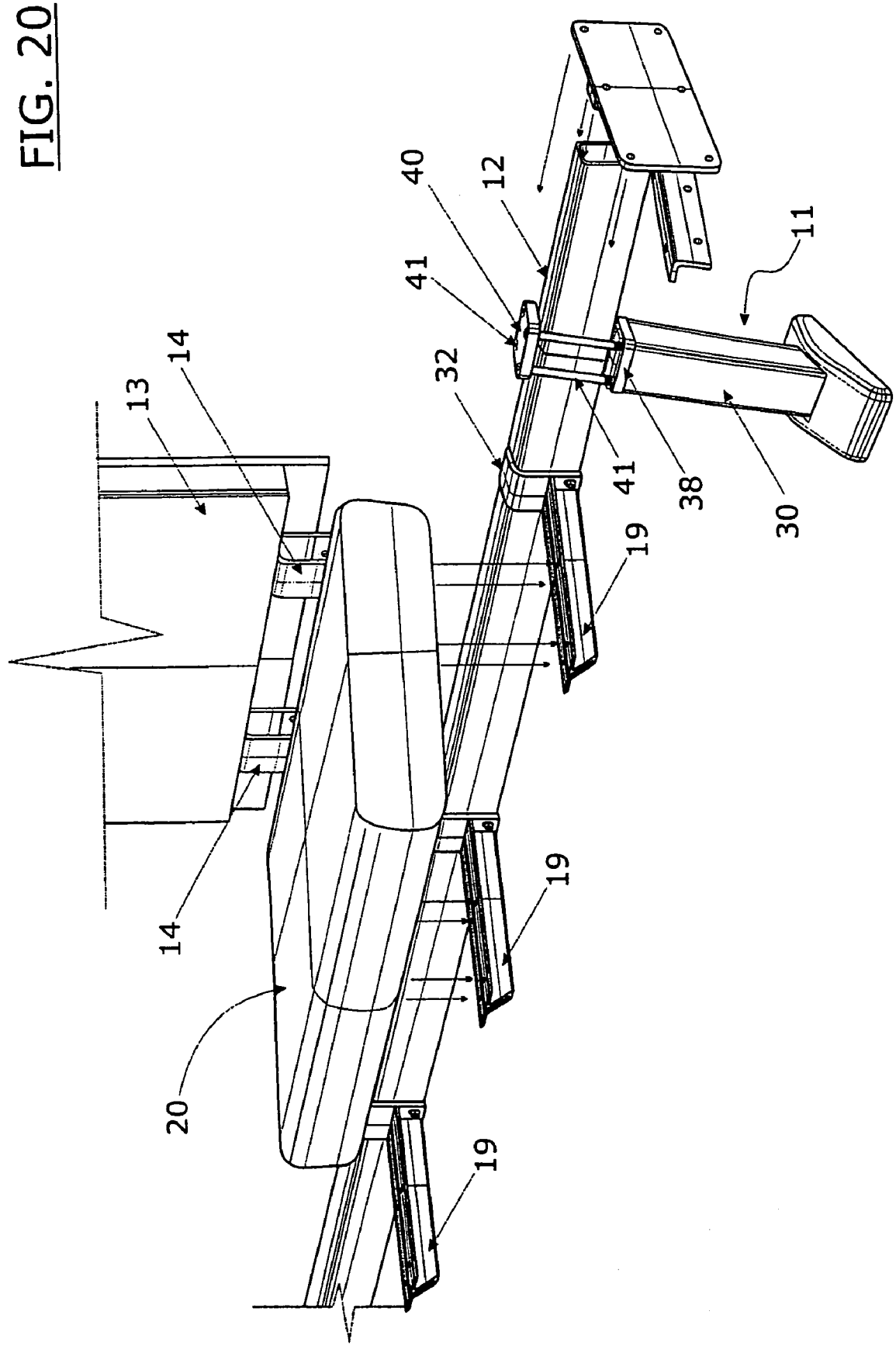
FIG. 20 is a perspective view of an embodiment of a seat used in the seating assembly illustrated in FIG. 1.
Figure 21:
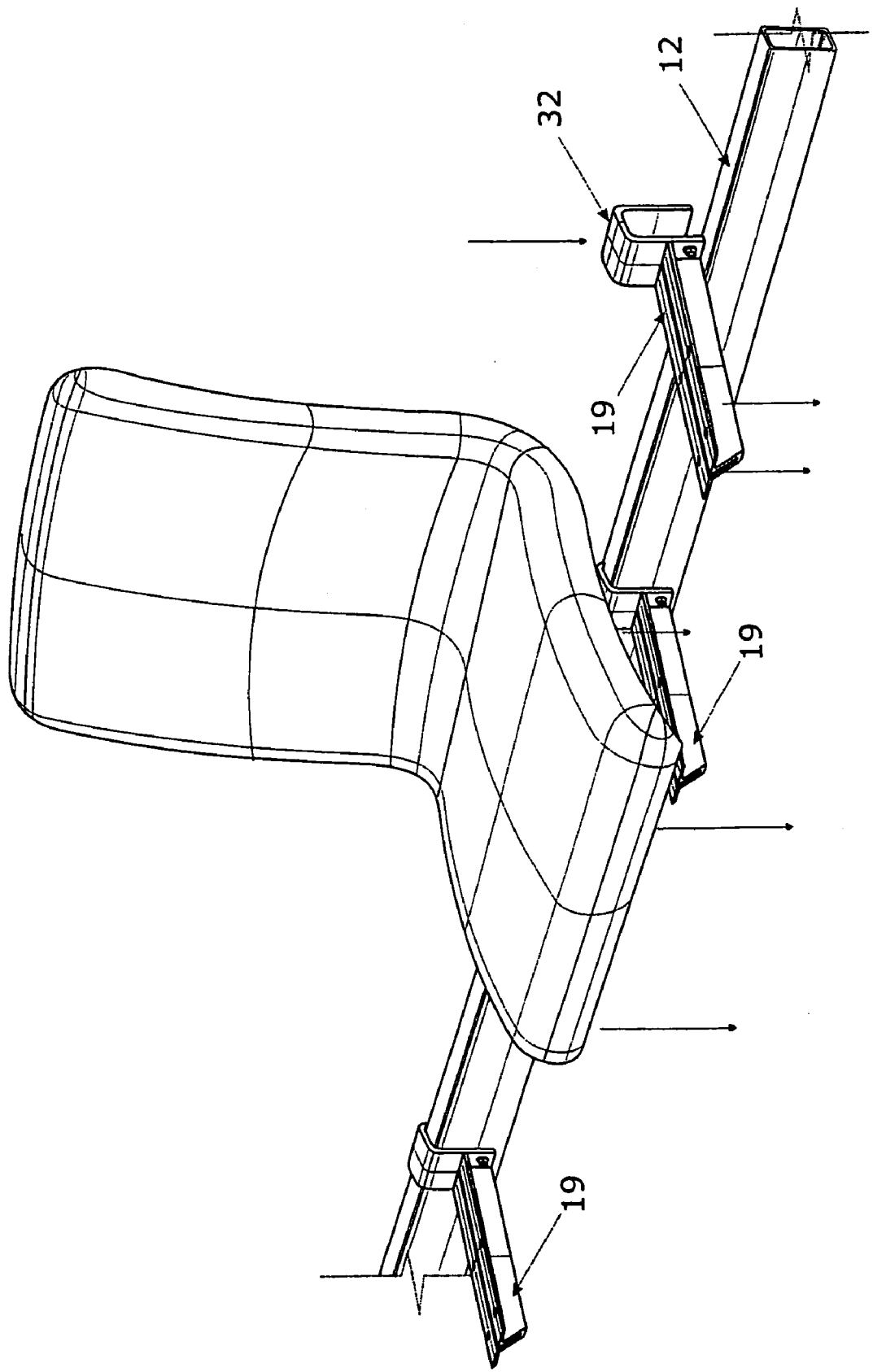
FIG. 21 is a perspective view of an embodiment of a seat used in the seating assembly illustrated in FIG. 1.
Figure 29:
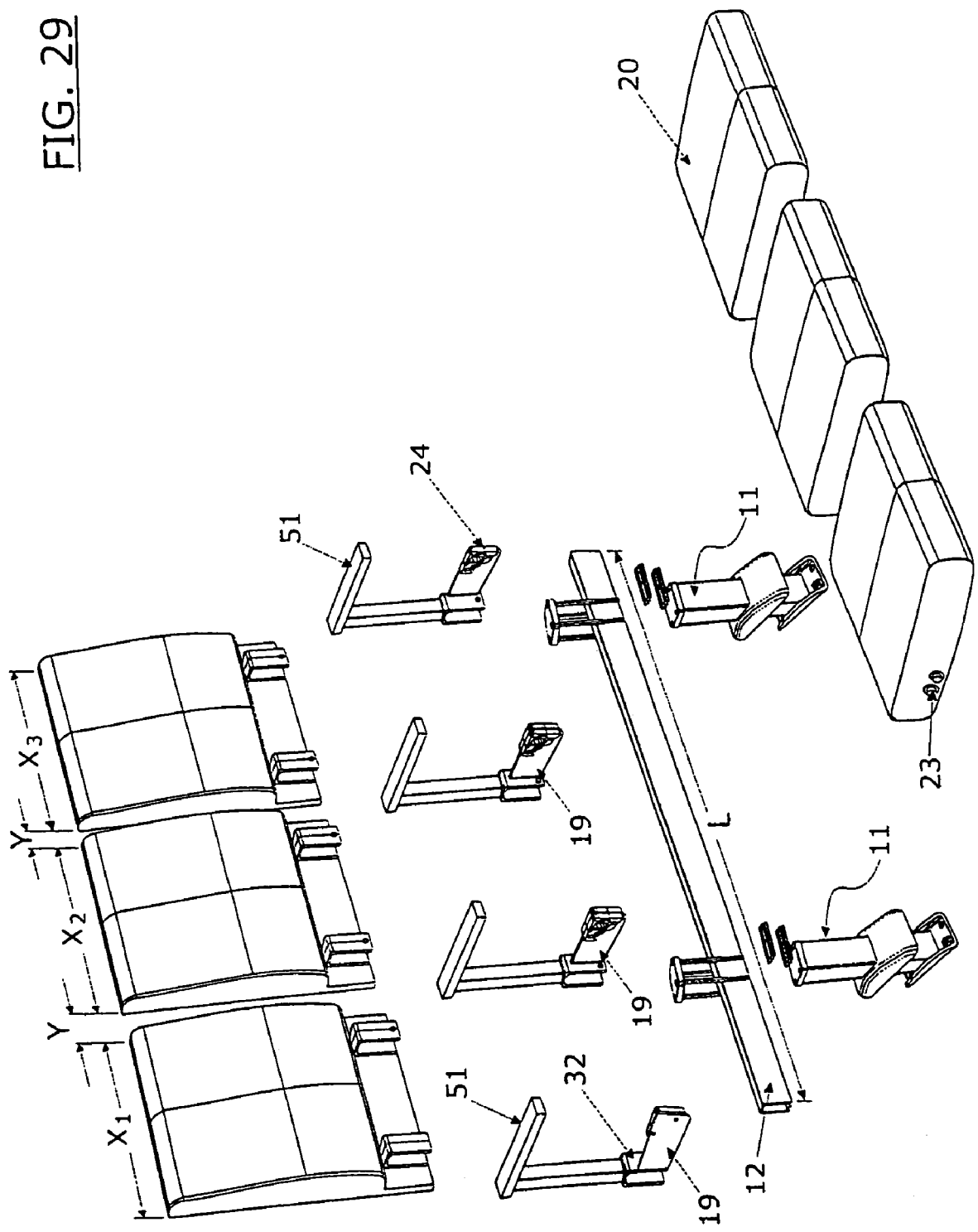
FIG. 29 is an exploded perspective view of an embodiment of the seating assembly illustrated in FIG. 1.
Figure 30:
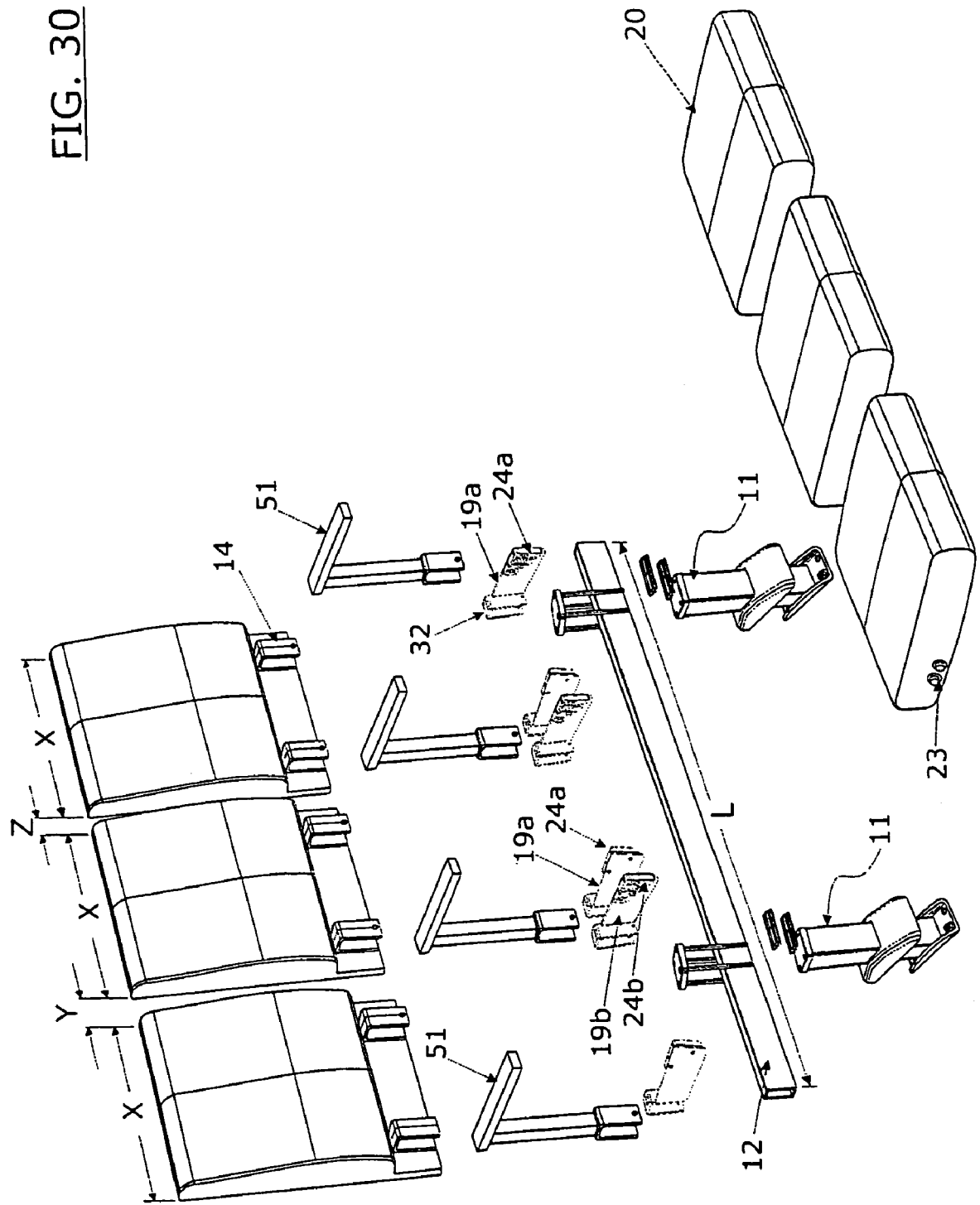
FIG. 30 is an exploded perspective view of an embodiment of the seating assembly illustrated in FIG. 1.

The seat connection mechanisms are used to connect the seat bottom assemblies 20 to the beam. The seat connection mechanisms 19 can be moved along the beam 12 to accommodate seat bottom assemblies 20 having different widths. The seat connector mechanisms may be a hinge of varying design, such as a piano hinge, pivot hinge, moving pivot hinge, or any hinge type known in the art. The seat connector mechanism may also not provide a pivot means, and simply support a stationary seat bottom (FIG. 20) or seat bottom and back combination (FIG. 21). The connector support 24 include a spring loaded, hinged, or any other mechanism of varying design known in the art to accommodate a lifting seat. A single seat connection mechanism 19 may be configured to connect to two seat bottom assemblies. In the alternative, separate left 19a and right 19b seat connection mechanism may be used each having separate left 24a and right 24b connector supports allowing the space between the seats to be adjusted. The benefits of using separate left 19a and right 19b seat connection mechanisms is illustrated in FIGS. 29-30 and described in more detail below.

In another embodiment, separate left 24a and right 24b connector supports may be attached to a single seat connection mechanism 19. This type of seat connection mechanism provides a predetermined space between seats. This space may be made used, for example for access to electrical or data ports.

Each seat bottom assembly may include a seat support 21 and seat cover 22. The seat cover 22 may be removable for customization purposes as well as for ease in maintenance. The seat connector mechanisms 19 may be configured so that each seat bottom assembly 20 can be separately pivotable.

The seat bottom assemblies 20 are pivotably secured to the beam 12 by the connector supports 24 of the seat connection mechanisms 19. Each seat bottom assemblies may be separately pivotable about an axis A (FIGS. 5a and b) going through the connector supports 24 of the of seat connection mechanisms. By placing the axis of rotation A of the seat bottom assemblies forward of the beam 12, more space is provided for the seat bottom assembly to lift to a vertical unoccupied position, providing additional egress space. A spring load mechanism may be used to provide a more compact seating assembly.

Figure 9:
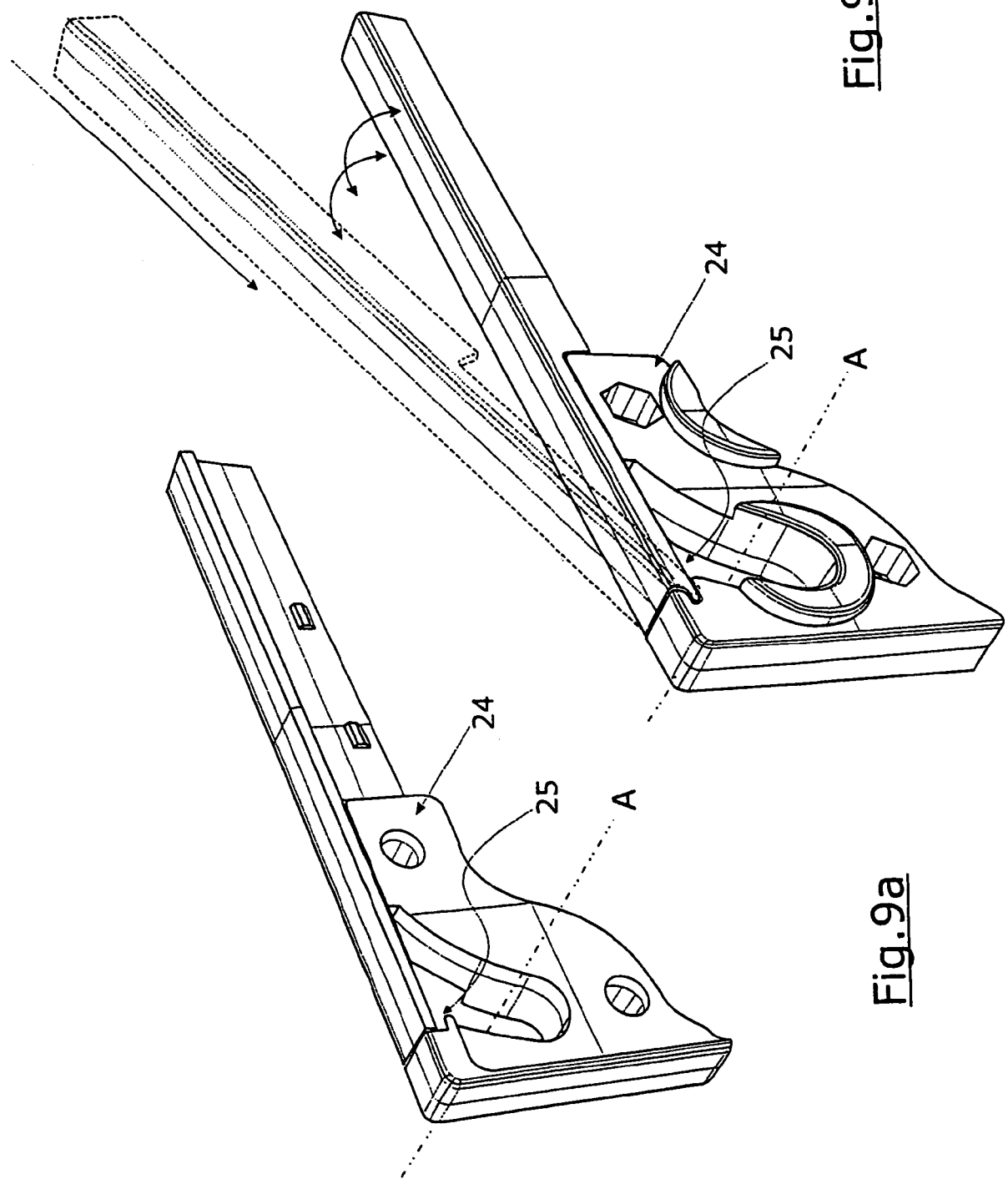
FIGS. 9a and 9b are perspective views of connector support saddle brackets in the open and closed positions, which may be utilized in the seat connection mechanism of the seating assembly illustrated in FIG. 1.

Preferably, the seat connector mechanism 19 extends forward substantially horizontally and allows the seat bottom assembly 20 to pivot in a counter balanced gravity lifted manner. This may be accomplished by using a connector support 24 in the form of a saddle bracket secured to the beam 12 that has an inner pivot channel 25 and a seat bottom assembly 20 with a pin portion 23 protruding from the seat support 21 to interact with the inner pivot channel 25. FIG. 9 illustrates the saddle bracket of this type of seat connection mechanism.

The interacting occurs such that the pin 23 protruding from the seat bottom assembly is angled with respect to the connector support saddle bracket 24 at a specific insertion angle such that the pin 23 is insertable into and removable from the inner pivot channel 25, and such that when the pin is angled with respect to said saddle bracket portion at any other angle than the insertion angle, the pin is retained in the inner pivot channel, and thus the seat bottom is pivotably secured to the beam 12. Such a seat connector mechanism is described in more detail in U.S. Pat. No. 6,698,834, the entirety of which is incorporated by reference herein.

End members 27 may be attached at the ends of the beam to define the width of the seating assembly. The end members may be merely aesthetic in nature or may be weight bearing to help support the seating assembly.

Figure 23:
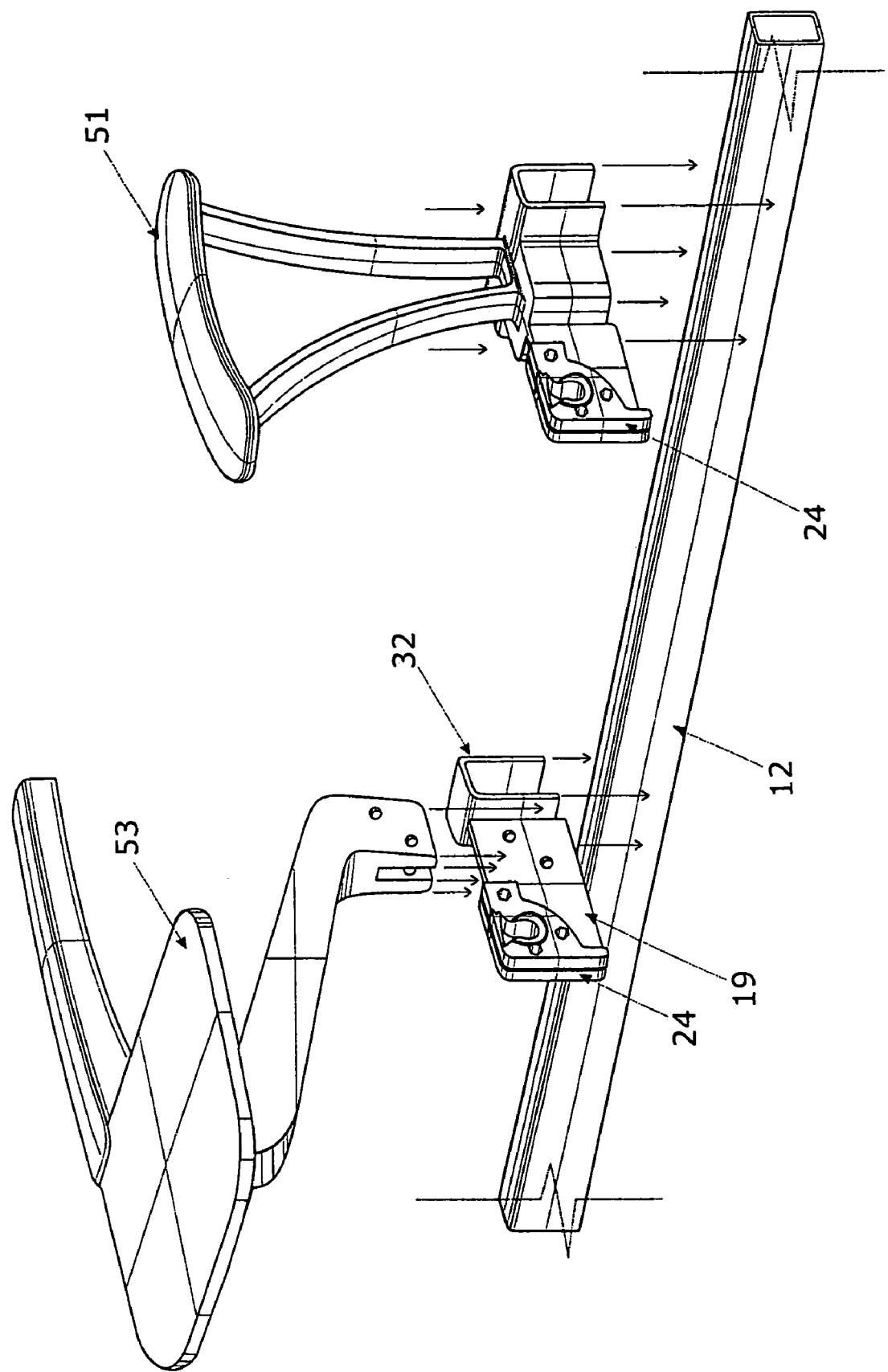
FIGS. 23-24 illustrate arm rests and tablet arms used in the seating assembly illustrated in FIG. 1.
Figure 24:
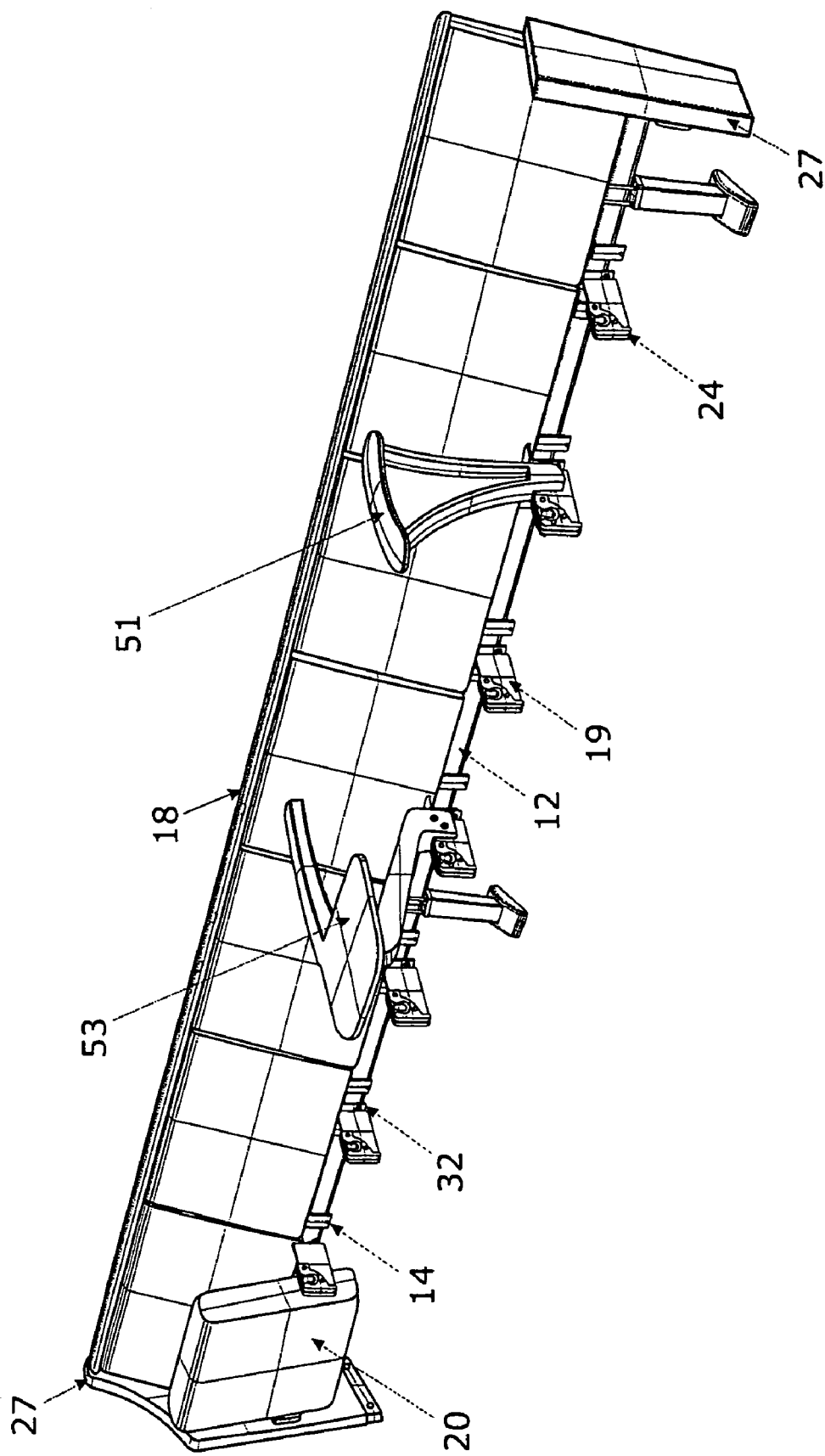

The seating assembly may also have armrests. (FIGS. 23a, 23b and 24). The armrests 51 may comprise end members attached to ends of the beam assembly to define the predetermined length of the row of seating. Also, the armrests may be connected to the beam assembly by seating connectors, where each of the seating connectors has a substantially U-shaped bracket, an opening of the U-shaped bracket corresponding to a thickness of the beam assembly, and positioned such that the U-shaped bracket substantially surrounds the beam assembly on three sides. The U-shaped brackets may be secured to the beams in any manner described above. The armrests may also be integral with the seating connectors. The armrests may also be in the shape and form of tablet arms 53 for use in classroom auditoriums.

Figure 6:
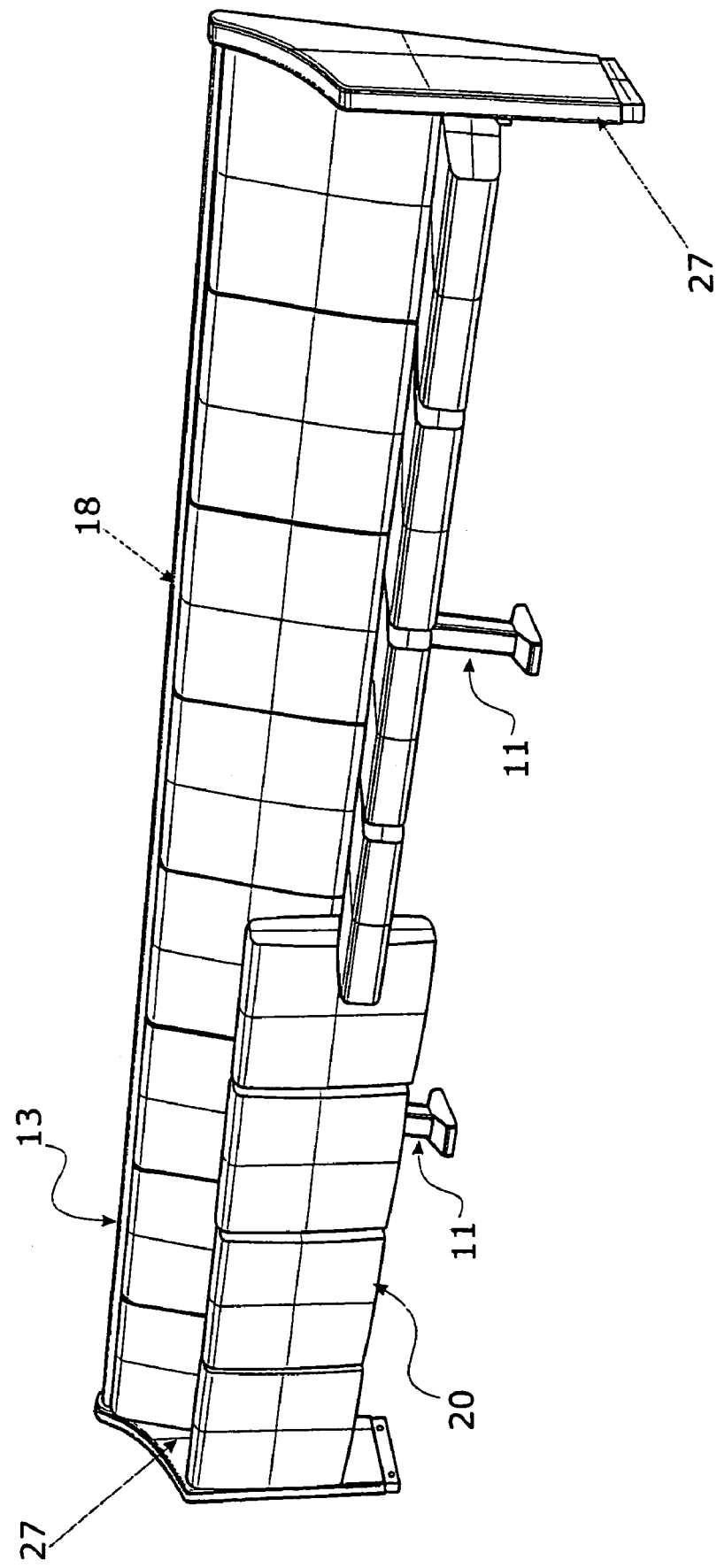
FIG. 6 is a perspective view of the seating assembly illustrated in FIG. 1 showing only one base member and the end members extending to the floor serving as a support for the seating assembly.

The beam 12 may be balanced on a single base member 11. In such an embodiment, the end members can extend to the floor to help support the beam as illustrated in FIG. 6. For wider seating assemblies, additional intermediate base members may also be employed to support the beam. However, the number of base members and supporting end members is less than the number of seat bottom assemblies in the seat assembly.

Figure 7:
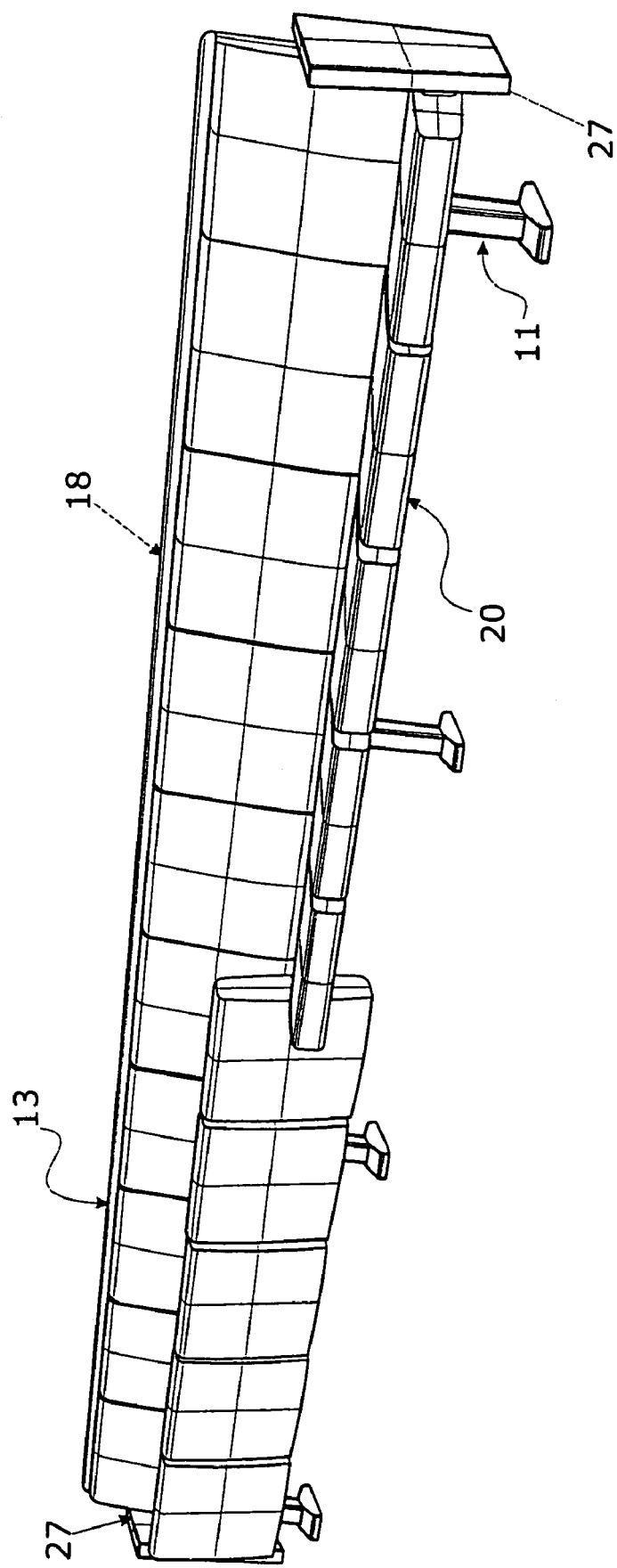
FIG. 7 is a perspective view of a seating assembly illustrated in FIG. 1 showing seats in both the upright and occupied positions having a continuous seat back member.
Figure 8:
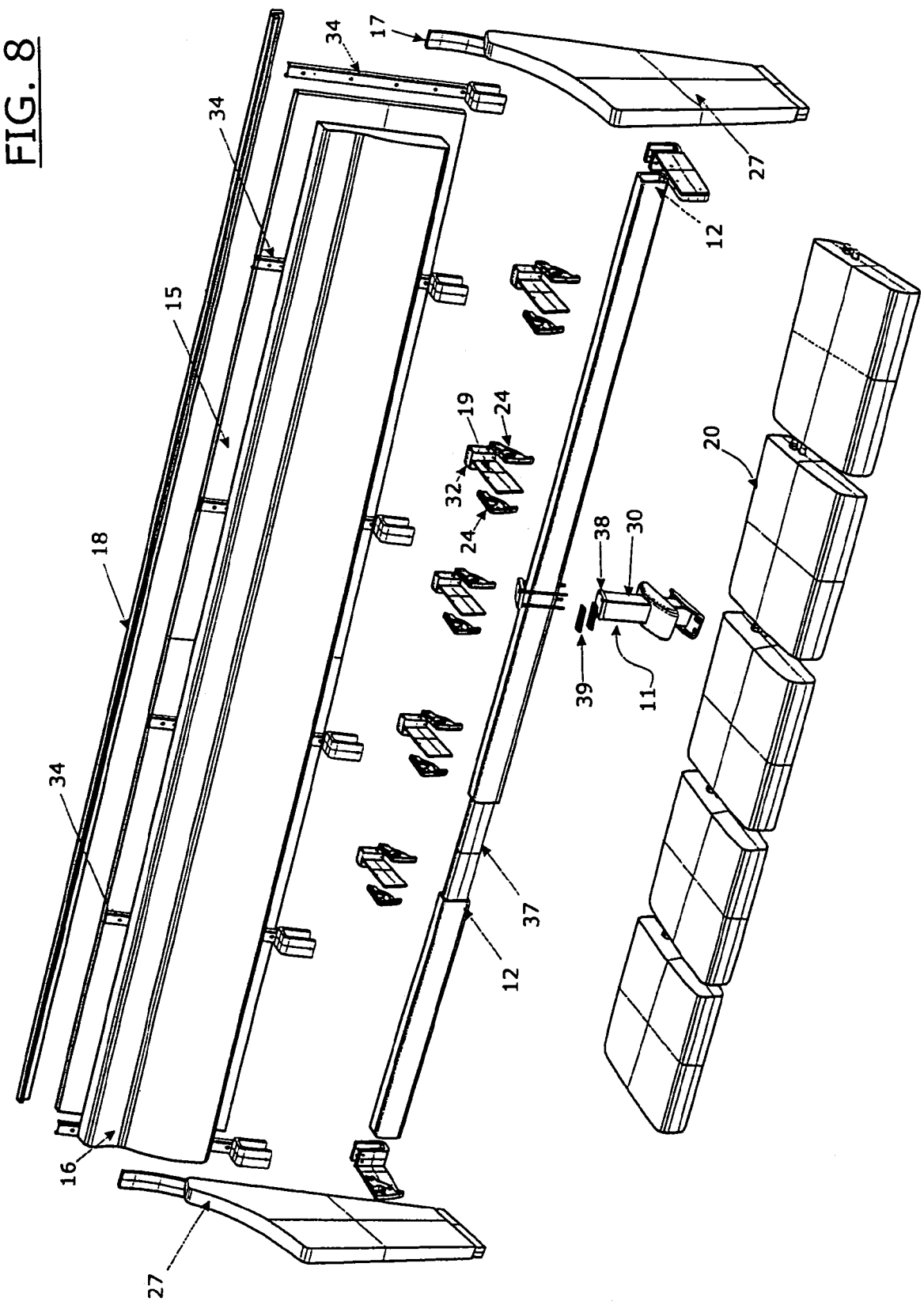
FIG. 8 is an exploded perspective view of the seating assembly of FIG. 7.
Figure 22:
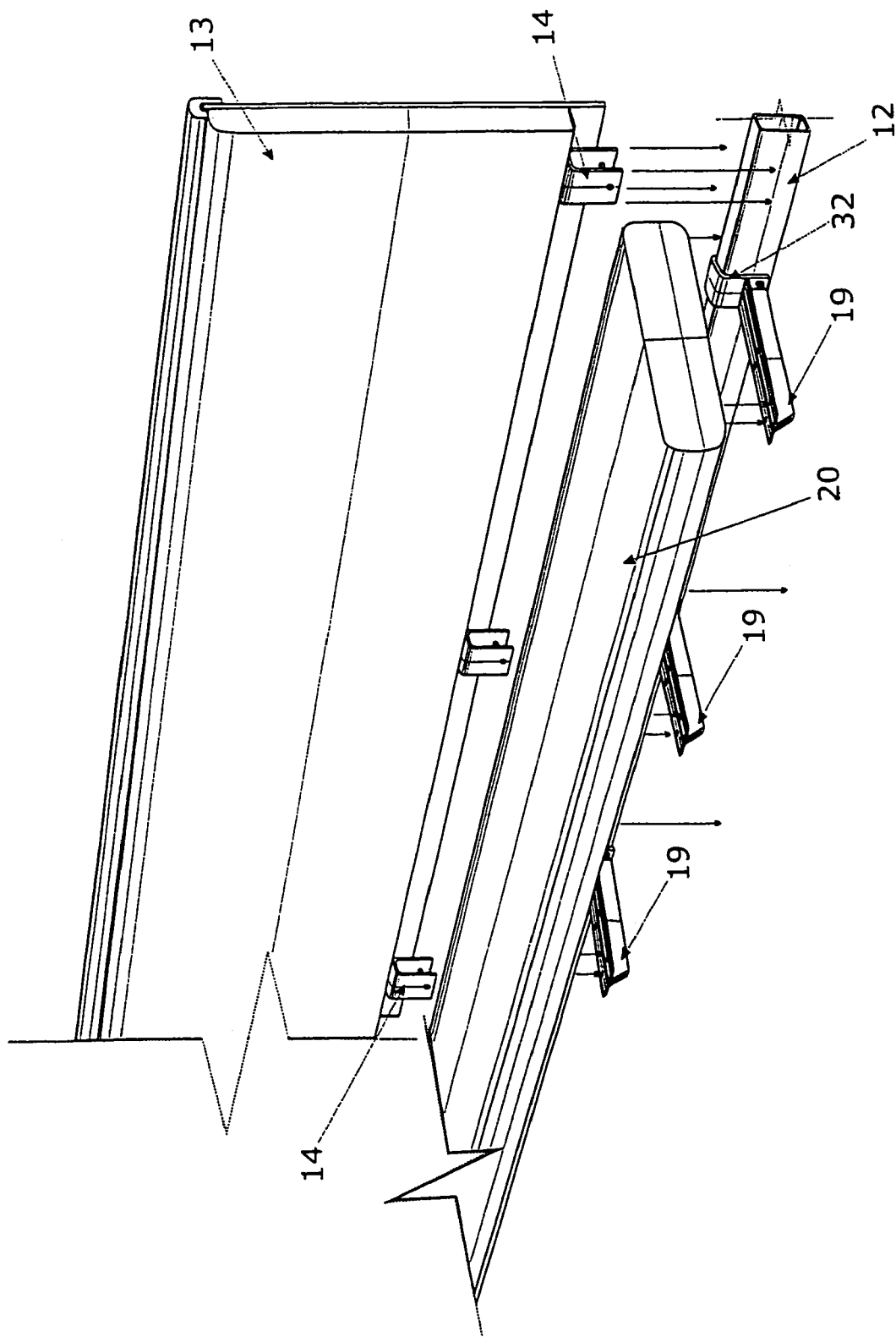
FIG. 22 is a perspective view of an embodiment of a seat used in the seating assembly illustrated in FIG. 1.

Another embodiment, which includes a single seat back assembly, is illustrated in FIGS. 7 and 8. A single seat back assembly may be a continuous seat back member where the back support 15 and a back pad 16 are each continuous members. This gives the seating assembly the appearance of a traditional bench (FIG. 22) or pew (FIG. 7). In this embodiment, a number of the seat assembly supports 34 rising substantially upwardly from the U-shaped bracket 14 can support the single continuous back member.

The process of assembling and installing the seating assembly is not as costly or labor intensive as assembling and installing prior art seating assemblies and allows great flexibility in seating assembly length and seating capacity. The use of the beam as the center structure of the assembly allows for a modularization of component assemblies eliminating the need for custom seating assemblies while allowing for any desired length of seating row.

Figure 18:
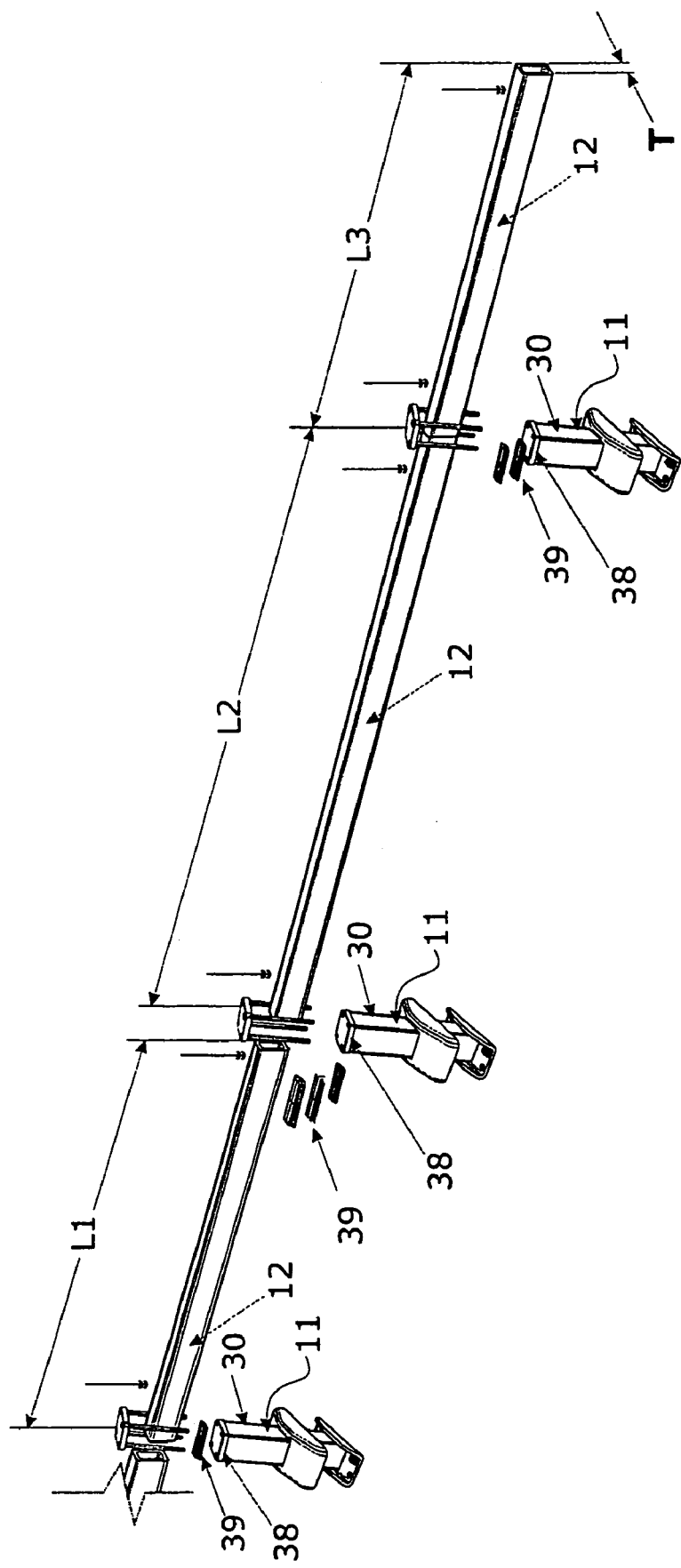
FIG. 18 is a perspective view of a beam assembly used in the illustrated in FIG. 1.
Figure 19:
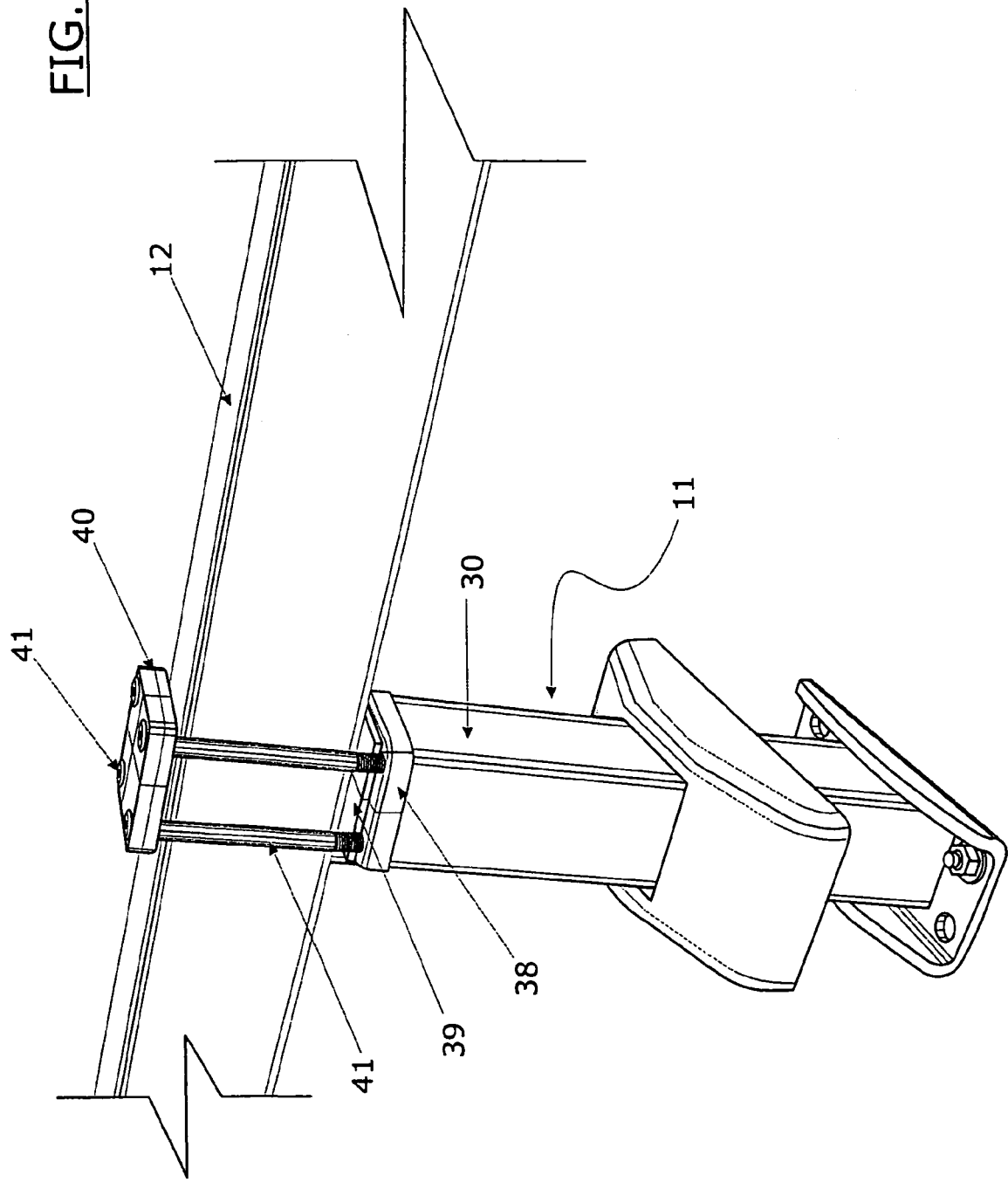
FIG. 19 is an enlarged perspective view of an section of a beam assembly used in the seating assembly illustrated in FIG. 1.

The process of assembly begins with first determining a desired length L of the seating assembly 10. A beam 12 may be a first standard length $L_1$, or a second standard length $L_2$. The beams may be connected end to end with a force fit joint piece 37 to achieve greater desired lengths L for the seating assembly. However, the beams preferably meet and are held at the base member 11, thereby not requiring a joint piece as illustrated in FIG. 18.

Figure 2:
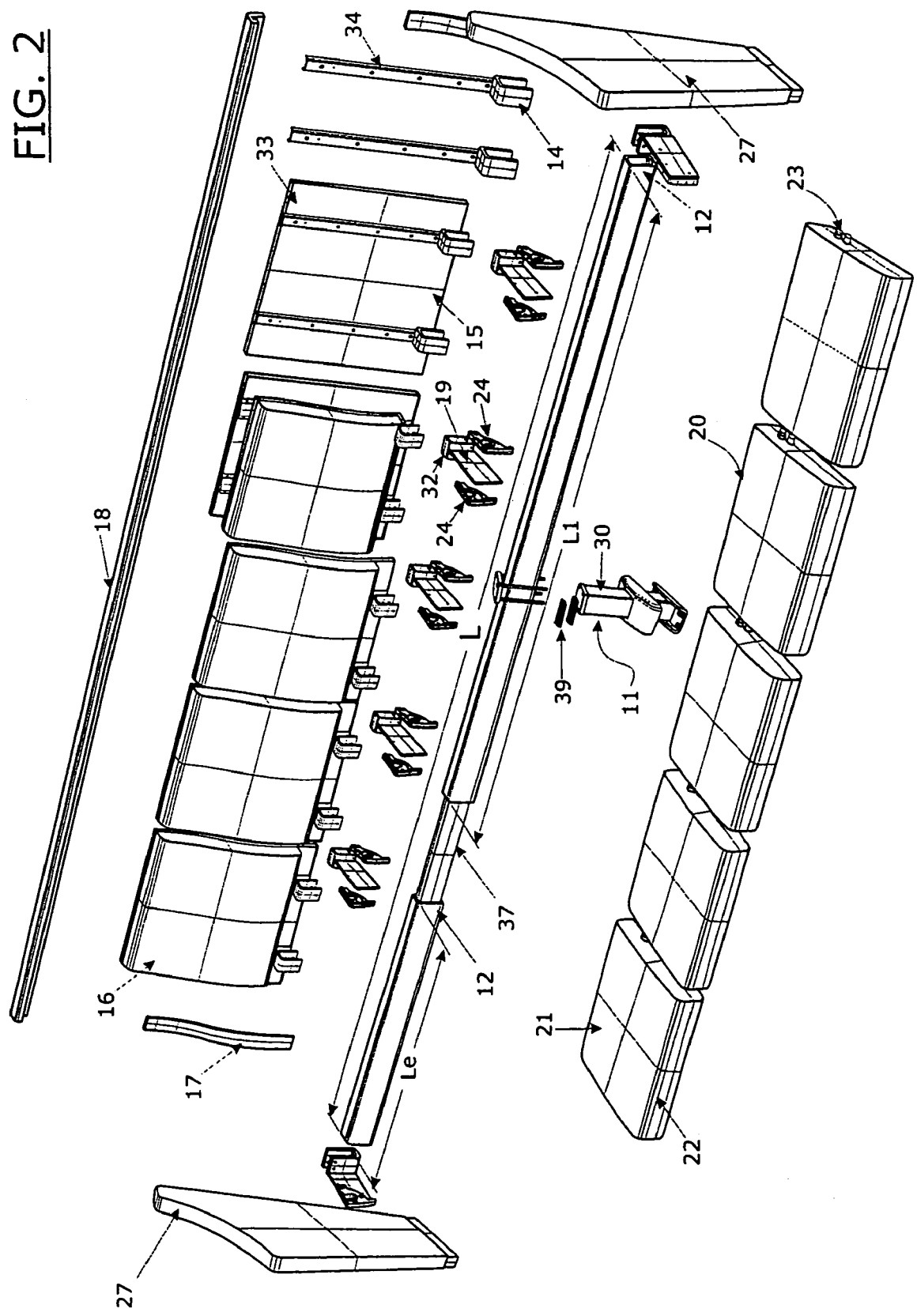
FIG. 2 is an exploded perspective view of the seating assembly of FIG. 1.
Figure 10:
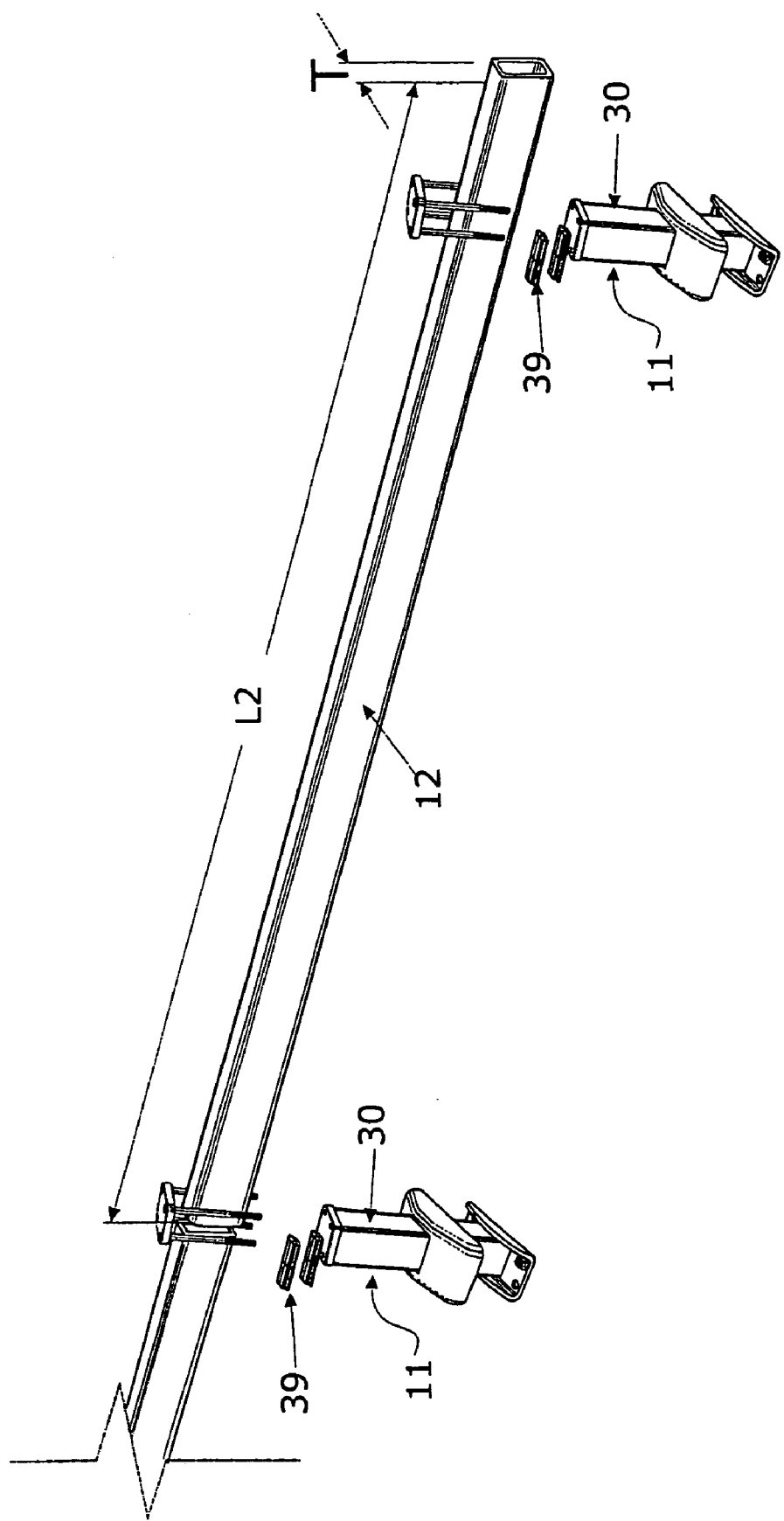
FIGS. 10-17 illustrate a method of assembling the seat assembly of FIG. 1.

Once a minimum number a seat width is exceeded, a combination of connected beams of first or second standard lengths can result in a beam assembly of any desired length L, when the beam assembly also includes cut extension beam pieces of length $L_e$. A beam extension should preferably have a smaller length $L_e$ than either length $L_1$ or $L_2$ for most efficient use of beams. FIG. 2 shows a beam of a first standard length joined with a beam extension so that the beam assembly reaches the desired length L. FIG. 10 shows a beam of the second standard length connected as part of a beam assembly.

The cut beam may be cut from a beam having a length selected from a plurality of standard lengths such as beams having the first standard length or the second standard length so that only standard sized beams need to be provided. A cut beam $L_e$ may be cut to any custom length such the beam assembly reaches the predetermined length of the row of seating without requiring customization of all of the plurality of beams while beam waste is decreased.

However, preferably, the standard beam lengths and the beam extension lengths may be chosen based on an optimal seat width in order to decrease beam waste as well as reach any desired assembly length. The advantages provided by using an optimal seat width to calculate the standard beam lengths is described below. In an embodiment where the standard beams lengths are based on an optimal seat width, again at least one of the beams has a standard length $L_1$ and a second beam has a standard length $L_2$ and each beam used for a beam assembly is selected from a group of beams of predefined standard lengths where the first standard length is different than a second standard length. Each of the predefined standard lengths is an integer multiple of one half of the optimal seat width.

For instance, if the optimal seat width is chosen to be 20", a standard length of a beam may be an integer multiple length of 10", resulting in a standard length of perhaps 30", 40", 50" or 60", etc. Note that a beam length of 30", 50" or 70", etc., are odd integer multiples of one half of the optimal seat width of 20".

Where a beams assembly includes at least one cut beam of length $L_e$, so that the sum of lengths of the beams reaches the predetermined length of the row of seating, and the cut beam is cut from the beams of predefined standard lengths based on an optimal seat width, the cut length $L_e$ may also be an integer multiple of one half of the optimal seat width. Preferably, the combination of standard length beams and cut length beams will include an even number of beam lengths which are odd integer multiples of one half of the optimal seat width. This insures that the each joint between the beams falls under a seat so that it may be supported by a base member.

The beam assembly can also have a third beam of a standard length $L_3$. Length $L_3$ is also selected from a group of beams of predefined standard lengths and is different than the first standard length and the second standard length.

More than one cut beam $L_e$ may be used, where each cut piece is cut from standard length beams selected from an optimal seat width. By choosing beams of standard lengths selected to be integer multiples of one half of the optimal seat width allows for flexibility in reaching predetermined seating lengths without substantial beam waste. Beams of a first and second standard length, selected based on an optimal seat width having lengths of integer multiples of one half of the optimal seat width may provide cut lengths in which both the cut pieces will both be integer multiples of one half of the optimal seat width. Further, the cut lengths from beams of standard length selected based on an optimal seat width having lengths of integer multiples of one half of the optimal seat width may provide at least one cut piece which is an odd integer multiples of one half of the optimal seat width. A beam assembly having two beams lengths that are an odd integer multiple of an optimal seat width will ensure that the beam connection points will fall beneath the seats. Further, an even number greater than zero of beam lengths having an odd integer multiple of an optimal seat width will also ensure that the beam connection points will fall beneath the seats.

For example, based on an average seat width of 21", a seating assembly rows any length may be reached with an inventory of beams of 115.5" ($L_1$), 168" ($L_2$) and 189" ($L_3$) with virtually no beam waste. Where a standard length beam is cut to a length which is an integer multiple of one half of 21", each piece can be reused to reach desired lengths. This allows for reduced inventory and supply of beams, while offering the flexibility of having many standard sizes available. The standard beams can be precut before installation based on a requested design, eliminating the need to inventory unnecessary lengths. And the standard lengths provide cut lengths such that beam waste is eliminated.

The inventoried beam lengths of 115.5" ($L_1$), 168" ($L_2$) and 189" ($L_3$) are each integer multiples of one half of the optimal seat width of 21". The standard length beams of 115.5" ($L_1$) are 5.5 seats of 21 inches longs. The 168" beams ($L_2$), are 8 seat widths long while the 189" beams ($L_3$) are 9 seat widths long. More specifically, the 115.5" inch beam is an odd integer multiple of one half of the optimal seat width of 21". Having at least two beams that are an odd integer multiple of one half of the optimal seat width in a beam assembly is crucial in providing that the beam joints occur under a seat so that the joint can be supported by a base member.

FIG. 25a illustrates a beam assembly that may be used for a desired seating row of 20 seats with an average seat width of 21". The total length of the row is 420". Two beams of 115.5" ($L_1$), and one beam of 189" ($L_3$), will accommodate this total length and also provide two beams which are an odd integer multiple of one half of the optimal seat width. The first beam is 5.5 seats long and ends under the sixth seat of the row. Beneath the sixth seat, a base member may be placed, and the second beam may abut the first beam end to end and the resultant joint will be supported by the base member. The second beam is nine seats long and will end under the fifteenth seat where again a base member will be position to support the joint with the abutting third beam. The third beam, again 5.5 seats long, will reach the remaining length of the row.

A single beam, custom supplied to span the entire 420" would be disadvantageous to use as the cost of inventorying, shipping and handling such a beam would be prohibitive. Also, using two beams of 10 seat widths length would not provide all the benefits of the present inventions system. Because a beam assembly of two beams of 10 seats does not incorporate two beams which are an odd integer multiple of one half of the optimal seat width, the beams in the beam assembly must abut between the seats and not beneath the seat. This drastically reduces the tolerances available and the flexibility in use of seating components, as discussed above.

Of course, it will be common that an average seat width different than 21" is requested. Such an example is illustrated in FIG. 25b. Taking the same 20 seat row, but in this case, only half the seats are ordered to be 21 inches wide while the other half are ordered to be 20 inches wide. In order to accommodate this difference from the optimal seat width, the same combination of beam lengths may be used; however, each beam must be trimmed slightly. Here the total length is 410" rather than the 420" inches in FIG. 25a. If the first and third beams are trimmed by 3 inches ($L_1$-3"), and the middle beam is trimmed by 4 inches ($L_3$-4"), the discrepancy from the optimal average seat width is accommodated with minimal resultant beam waste. If custom length beams were to be used, the beam waste in order to accommodate changes in seating width would be much greater.

Also, deviations from the selected optimal seating width can be accommodated by use of separate left and right seat connector mechanisms 19a, 19b allowing the space between the seats to be adjusted accordingly.

Because of the flexibility the seating assembly system of the present invention provides for adjusting or changing the modular seat widths; the trimming of the beams may be done onsite to accommodate last minute changes. However, the beams may also be trimmed prior to shipment to the assembly site in order to be prepared for easier assembly.

In addition to the resultant waste being reduced, the ends of beams are often damaged in shipping from the factory to the warehouse. Trimming the very ends of the beams can be beneficial as the damaged bent ends may be removed.

A large room utilizing a seating assembly such as the present invention would likely have multiple rows of seats having different lengths. In order to reach each of those lengths, cut beams of different lengths must be used according to the invention. Combinations of the standard length beams and certain cut length beams ($L_e$) of varying length that include an even number of beam lengths which are odd integer multiples of one half of the optimal seat width will allow the seating row to reach any desired length.

FIGS. 26a-c illustrate three such combinations of standard lengths and cut lengths to reach a row 21 seats. FIG. 26a shows a combination of a beams of $L_1$ (5.5 seats) and $L_3$ (9 seats) and a cut length equal to 6.5 seats, $L_{eA}$. Length $L_{eA}$ can be formed but cutting a standard length beam of 9 seats ($L_3$) which leaves a remaining piece equal to the 2.5 seats. This 2.5 seat piece is $L_{eB}$. Note that this combination includes two beam lengths which are odd integer multiples of half of the optimal seat width of 21".

FIG. 26b illustrates a combination of a beams of length $L_1$ (5.5 seats) and $L_2$ (8 seats) and two cut lengths. One of the cut lengths is equal to 5 seats, $L_{eC}$. Length $L_{eC}$ can be formed by cutting a standard length beam of 9 seats ($L_3$) which leaves a remaining length equal to the 4 seats. This 4 seat length is $L_{eD}$. The second cut length is equal to 2.5 seats to reach to total length of 21 seats. The 2.5 seat length ($L_{eB}$) can be obtained from the remaining length from the cut piece in FIG. 26a.

FIG. 26c illustrates a combination of a beams length $L_2$ (8 seats) and three cut lengths. One of the cut lengths is equal to 4 seats, $L_{eD}$. Length $L_{eD}$ was obtained from the remaining length from one of the cut lengths in FIG. 26b. The other two cut lengths are each equal to 4.5 seats to reach a total length of 21 seats. The 4.5 seat lengths are each designated $L_{eE}$. The $L_{eE}$ lengths can be formed by cutting a standard length beam of 9 seats ($L_3$) in half. Alternatively, a $L_{eD}$ can be formed by cutting a $L_2$ length standard length beam leaving a remaining length of 3.5 seats ($L_{eF}$) to be used elsewhere. In this combination illustrated in FIG. 26c, a standard length $L_3$ cannot be used instead of the two cut lengths of $L_{eD}$ because the combinations of beams will not include an even number of odd integer multiple lengths of the optimal seat length.

Figure 27A:
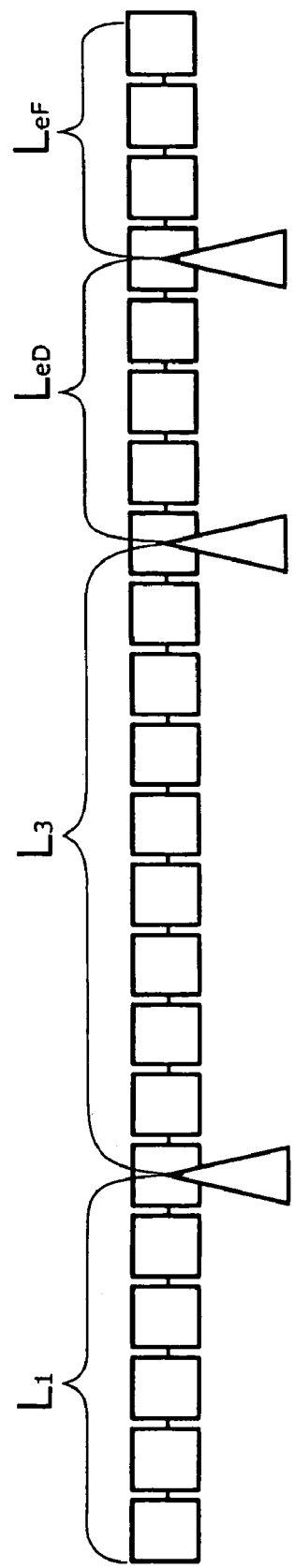
FIGS. 27a-b are schematics of combinations of beams used in the seating assembly illustrated in FIG. 1.
Figure 27B:
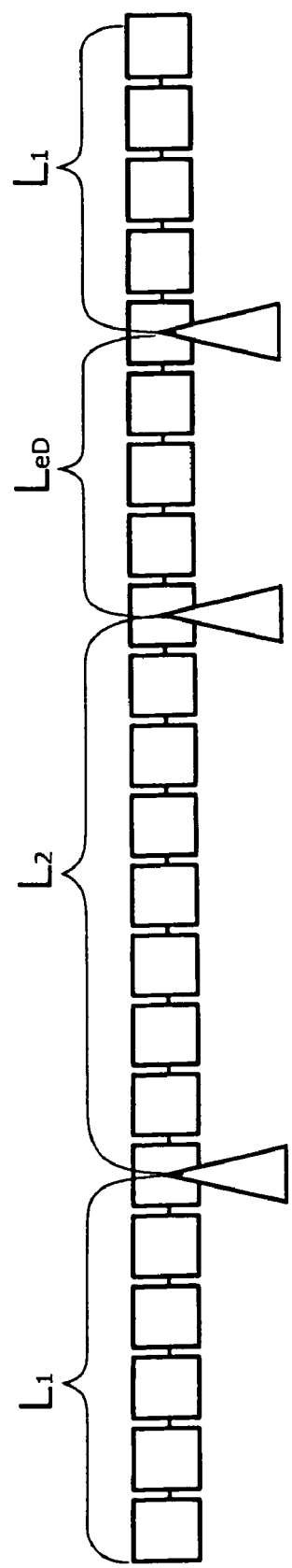

FIG. 27a-b illustrate beam assemblies for other lengths of seating rows to show how the remaining cut lengths ($L_e$) can be reused so that any length row can be obtained without beam waste when the seat width average width is an optimal seat width. FIG. 27a illustrates a combination of a beams of length $L_1$ (5.5 seats) and $L_3$ (9 seats) and two cut lengths. One cut length is four seats long ($L_{eD}$) while the other is 3.5 seats long ($L_{eF}$). The total seat length of this beam combination is 22 seats. FIG. 27b illustrates a combination of two beams of length $L_1$ (5.5 seats) and one beam of length $L_2$ (8 seats) and a cut beam 4 seats long ($L_{eD}$). The total seat length of this beam combination is 23 seats.

To increase efficiencies and standardization, a standard length may be cut into predetermined cut lengths to provide the necessary number of odd integer or even integer multiples lengths. For example, a first standard beam length may be 10 seats length. A 10 seat long standard length will provide four 2.5 seat length cut pieces. Thus every assembly may use two, 2.5 seat length cut pieces on each end, satisfying in a standard manner, the provision of two odd integer multiple for each assembly. The remaining beam length necessary to reach the predetermine assembly length may be provided from the other standard lengths.

Once the beam components are assembled to the desired length, the beam or beam assembly is supported by at least one base member 11 in a substantially horizontal position such as in a manner illustrated in FIG. 10. To help level the beam 12, or to compensate for even floor surfaces, supplements or shims 39 may be placed under the beam and used with the base members 11.

Figure 11:
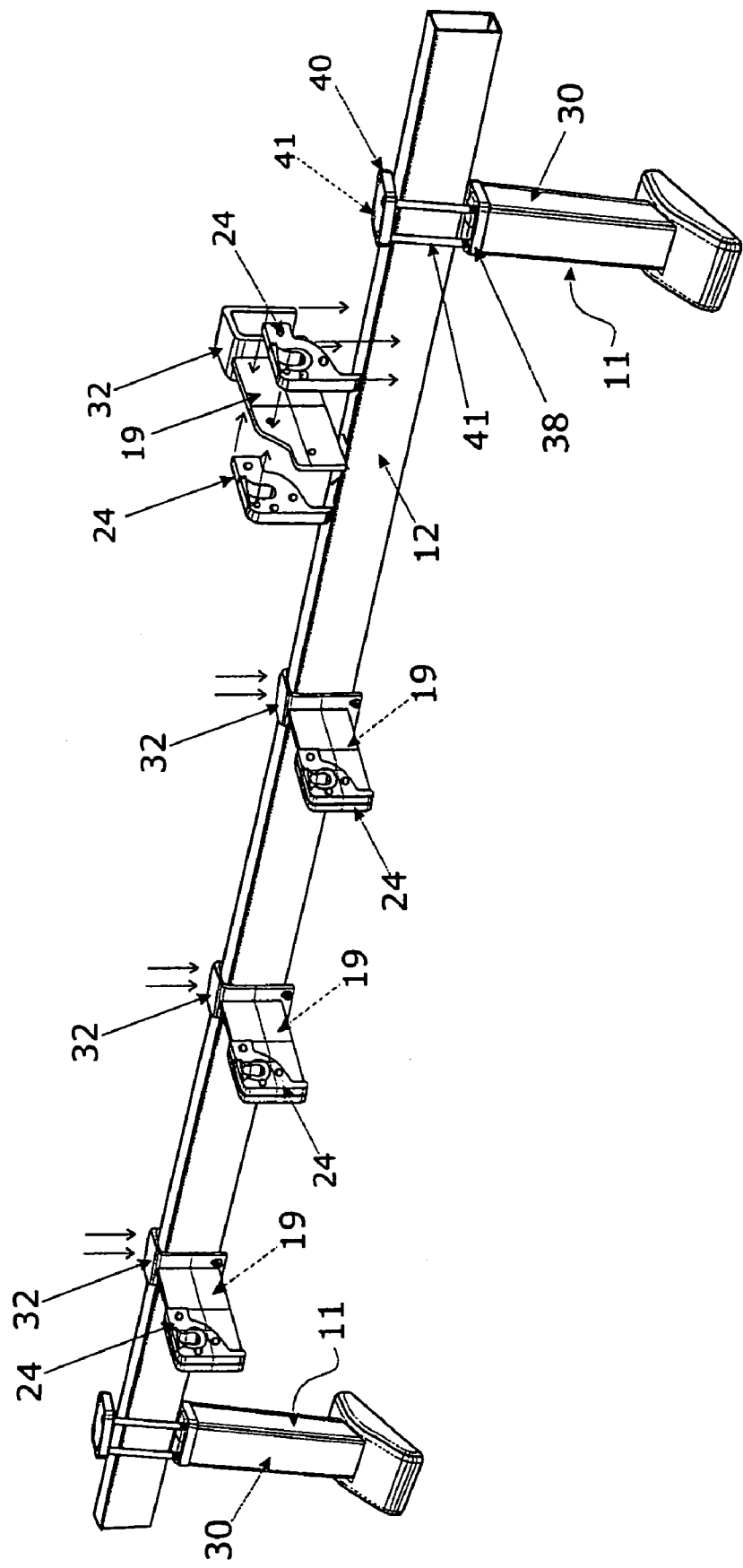

Once the beam assembly is in place, the next step may be to fix the seat connection mechanisms 19 to the beam 12. A single seat connection mechanism 19 may be configured to connect to two seat bottom assemblies as illustrated in FIG. 11. Separate left 19a and right 19b seat connection mechanisms may be used each having separate left 24a and right 24b connect supports allowing the space between the seats to be adjusted. (FIG. 30). The U-shaped seat connection brackets 32 may be positioned over the beam 12 to fixedly secure the seat connection mechanisms. The widths of the seat bottom assemblies 20 can be selected next.

The modularity of the present invention allows the seat bottom assembly to have different widths than other seat bottom assemblies easily allowing flexibility in design and assembly. This selection process for this modularity of the seat bottom assemblies can be illustrated with an example. If a seating design calls for a row that is 216" long, and 24" is the optimal seat width. Nine 24" seat bottom assemblies could be used to meet such a specification. However, a 222" row may be desired. The 222" row could be assembled from three 24 inch seat bottom assemblies and six 25 inch assemblies. In some instances it may be more practical to select seat bottom assembly widths from a small number of standard widths known in the industry. Two 23", two 24", one 25" and two 26" seat bottom assemblies is a combination which would reach the desired length of 222". In both cases, the desired length of the seating assembly is achieved without the customization of the seating components.

In addition to avoiding the time and expense of customization of seating assemblies, the modularity of the present invention allows the seating assembly length to be adjusted in one inch increments on the job site by interchanging seat bottom assembly widths.

As described above, FIG. 29 illustrates how three different seat widths ($X_1$, $X_2$ and $X_3$) can be used in combination to reach desired length L of the seating assembly. The spacing between the seats, Y, is constant due to the use of a seat connection mechanism between the seats. The small number of standard widths, chosen to be appropriate for a width of a seating area, may be between sixteen and twenty-six inches in one inch increments. The combinations of standard widths can be selected from a group of less than five widths, but when design requirements call for more seating variety, may be selected from a group of less than ten widths.

In addition to interchanging seat bottom assembly widths, using separate left 19a and right 19b seat connection mechanisms having separate left 24a and right 24b connect supports provides another way to customize the length of the seating assembly and use standard components. FIG. 30 illustrates the benefit of using left and right seat connector mechanisms. Where separate left and right seat connector mechanisms are used, the space between the seats can be adjusted by position of the seat connector mechanisms along the beam. Thus, different desired lengths of seat assembly can be reached with uniformed width seats, simply by positioning separate left and right seat connector mechanisms at appropriate spacing along the beam. As shown in FIG. 30, by positioning the seat connector mechanisms at different widths between the seat (Y and Z) a desired length L for the seating assembly can be achieved with uniformed width seats (X). The separate left and right seat connector mechanisms are also standardized components.

It is further envisioned that separate left and right seat connector mechanisms and different width seats can be used in conjunction for further customization of the seating assembly.

The use of separate left and right seat connector mechanisms may provide space between the seats for armrests or tablet arms. Where a single seat connector is used, there may be insufficient space for an armrest or tablet arm. In this case, an armrest or tablet arm which is integral with the seat connector mechanism may used. However, with space between the seats, an armrest or tablet arm with connected directly to the beam with its own U-shaped bracket allows greater flexibility. An armrest or tablet could be added or replaced without removing the seat bottom and without needing a different seat connector mechanism.

Figure 12:
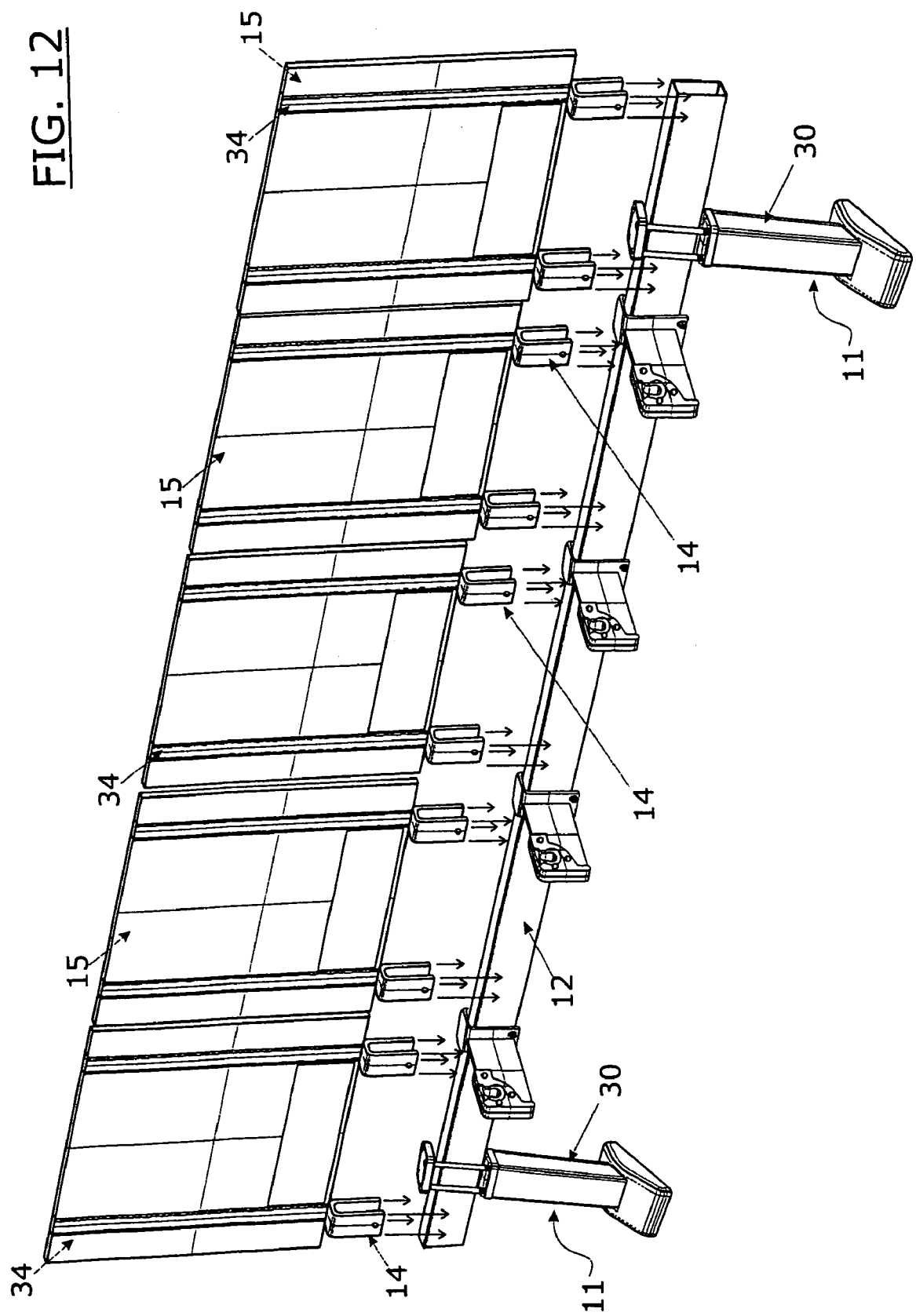
Figure 13:
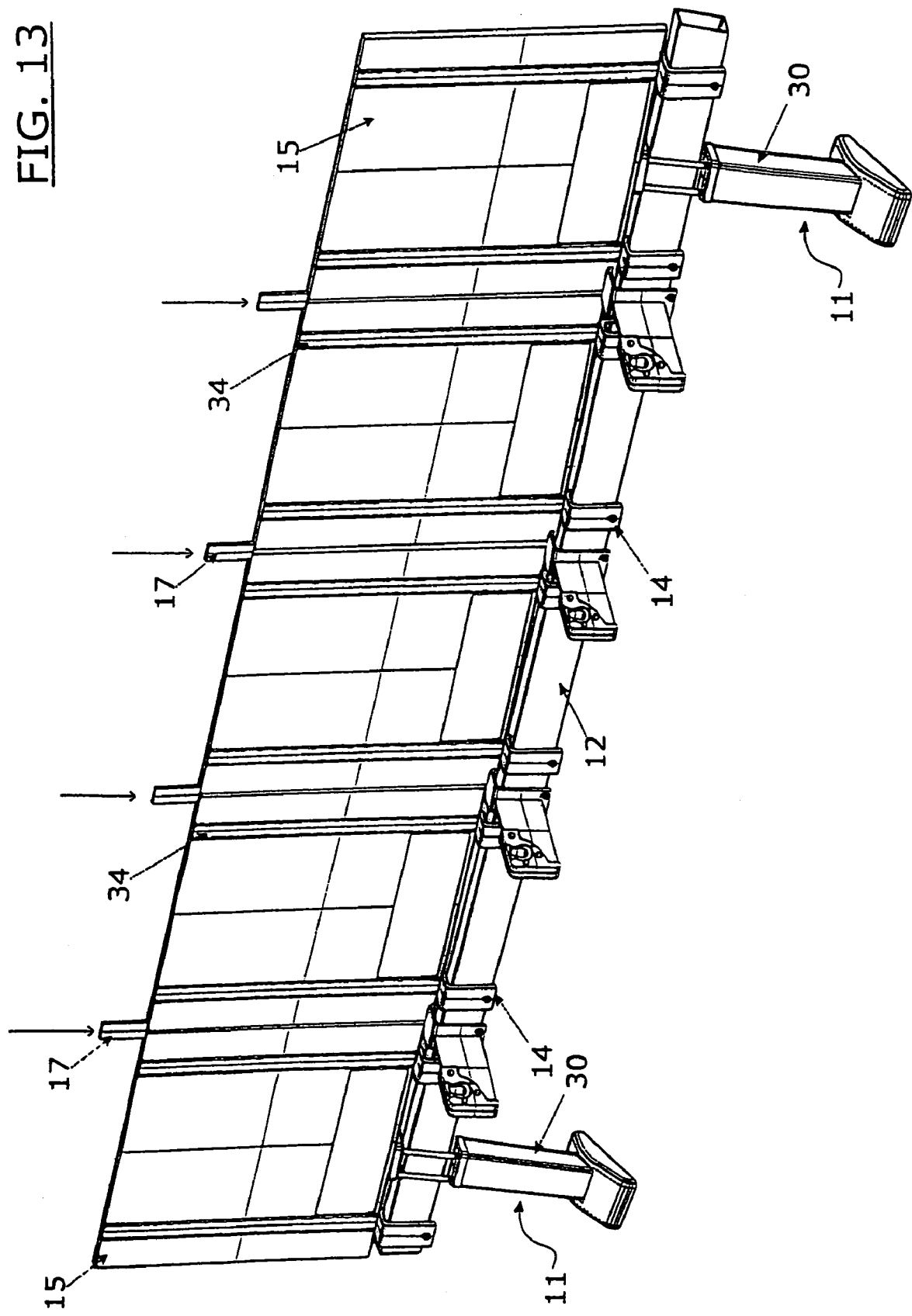
Figure 14:
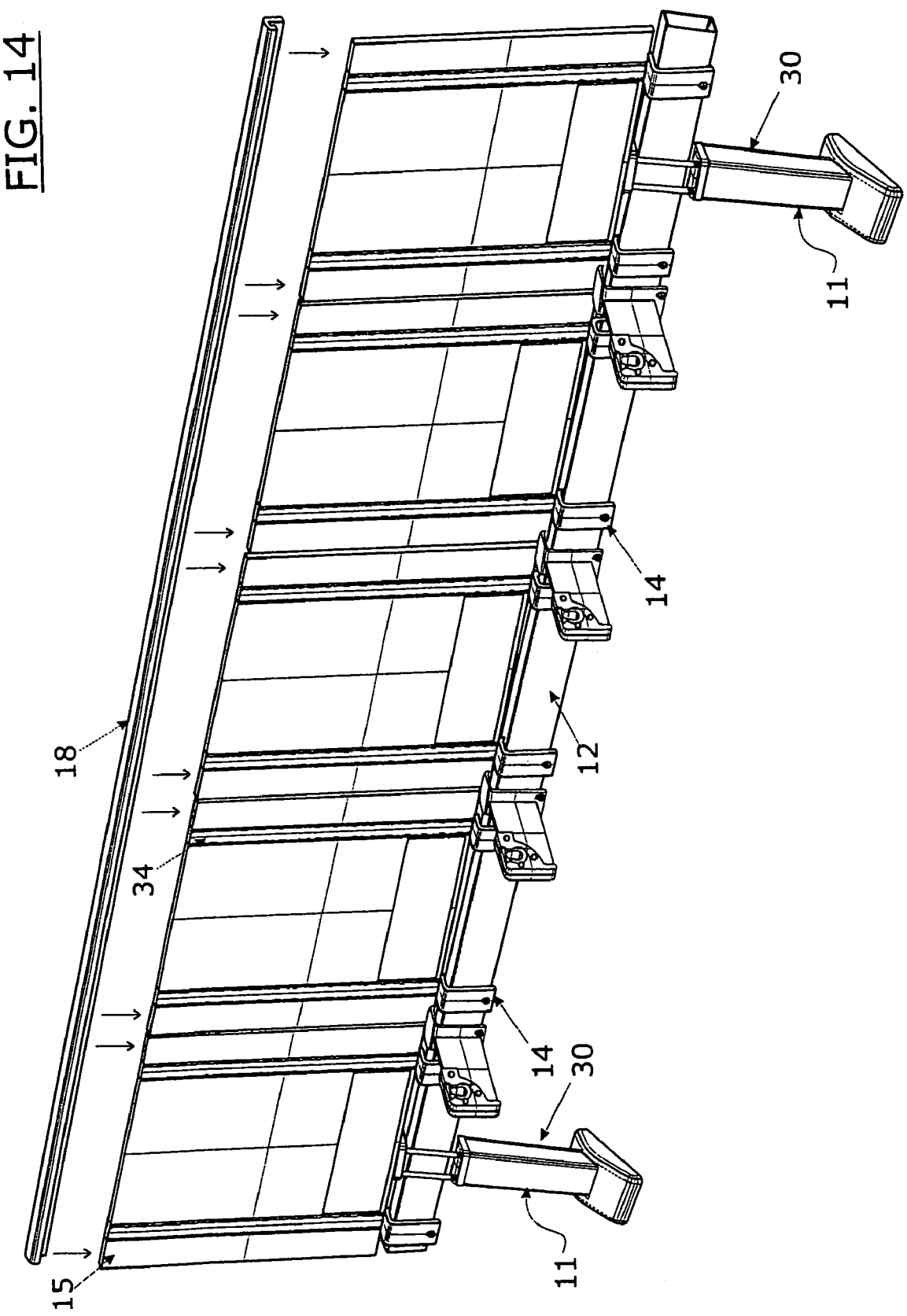
Figure 15:
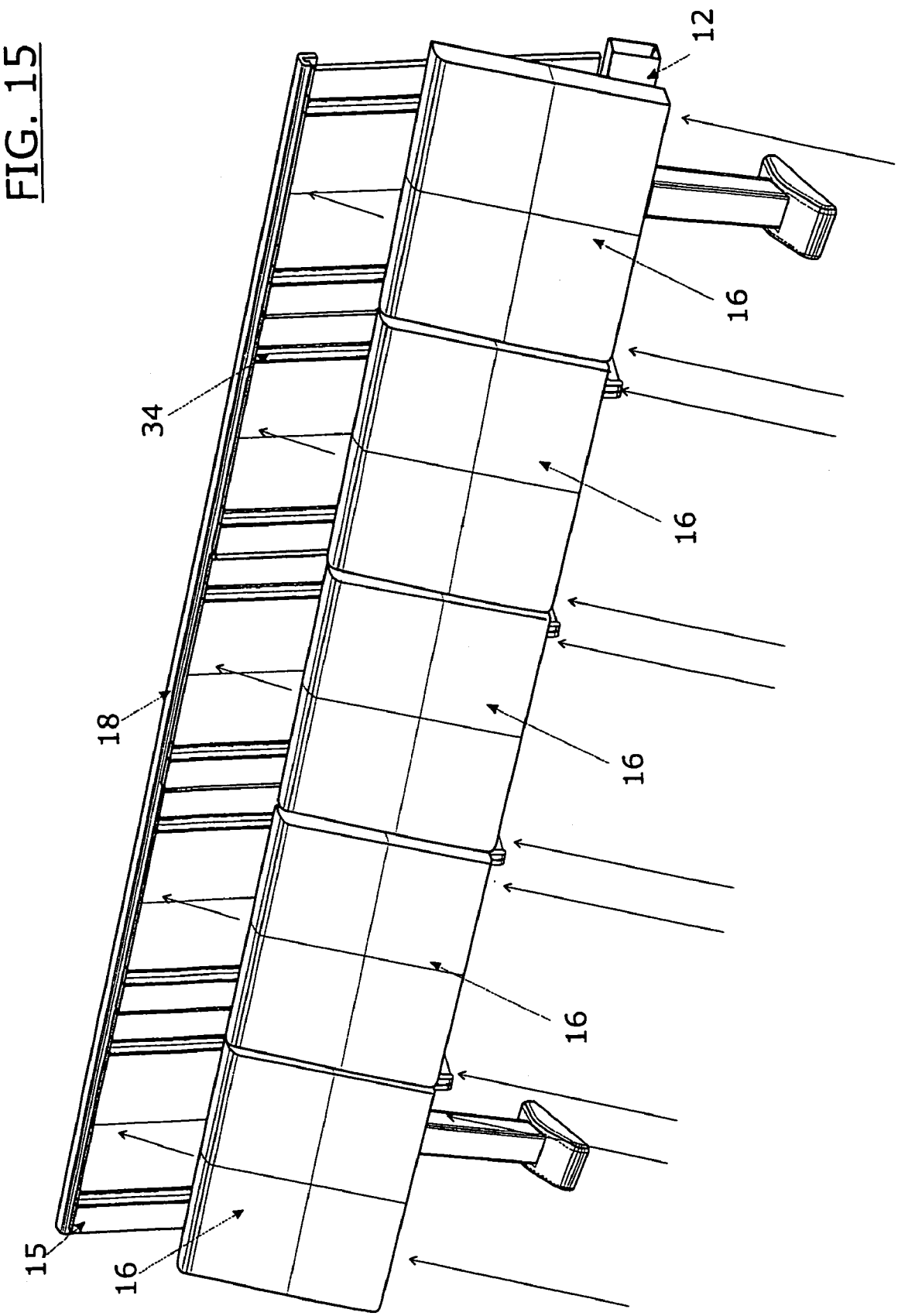

Next, the seat back assemblies 13 are fixed to the beam. (FIGS. 12-15). While a seat back assembly may be a single continuous member, it is also envisioned that the seat bottom assembly be a width corresponding to the width of the selected seat bottom assemblies. The back support 15 is attached to the beam 12 by positioning the U-shaped brackets 14 over the beam 12. (FIG. 12). Next, back connector inserts 17 are positioned in the grooves 33 between the back supports 15. (FIG. 13). Then, the top member 18 is fitted across the top of the seat back assemblies 13. (FIG. 14). Finally, the back pads 16 are put in place. (FIG. 15).

Figure 16:
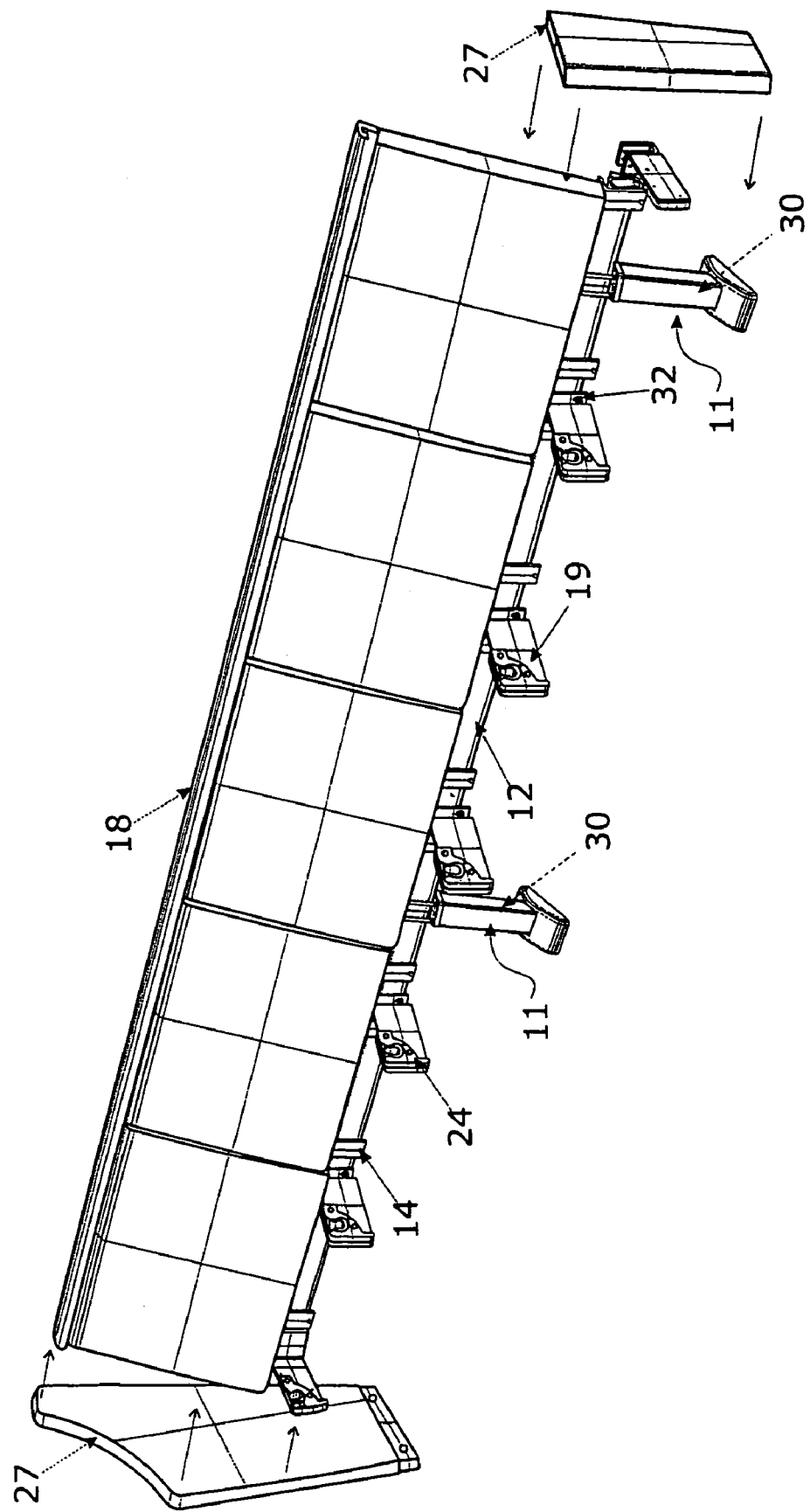

The end members 27 may be installed next. FIG. 16 shows both a weight bearing end member that extends to the floor and a shorter non-weight bearing end member. Where an end member is near a beam extension piece is joined, it is preferable that a weight bearing end member is used. Likewise, where an end member is adjacent to a base member 11, a non weight bearing end member may suffice. The type of end used may also be based on aesthetic considerations.

Similarly to the seat bottom assemblies, the seat back assembly widths may be chosen directly based on the desired width of the seating assembly, without necessarily corresponding to the width of the selected seat bottom assemblies by selecting a different width for at least one of the seat back assemblies from the selected width of at least one other seat back assemblies. The width of each of the seat back assemblies may also be selected from a relatively small number of standard widths so as to cause the seating assembly to have the desired length without requiring customization of the widths of the plurality of seat back assemblies before fixing the seat back assemblies to the beam.

Again, depending on design and seating requirements, the widths can be selected from a group of less than ten, or less than five standard widths. The seat connection mechanisms are positioned appropriately along the beam to receive the seat bottom assemblies. The U-shaped seat connection brackets 32 are positioned over the beam 12 to fixedly secure the seat connection mechanisms. (FIG. 15).

Figure 17:
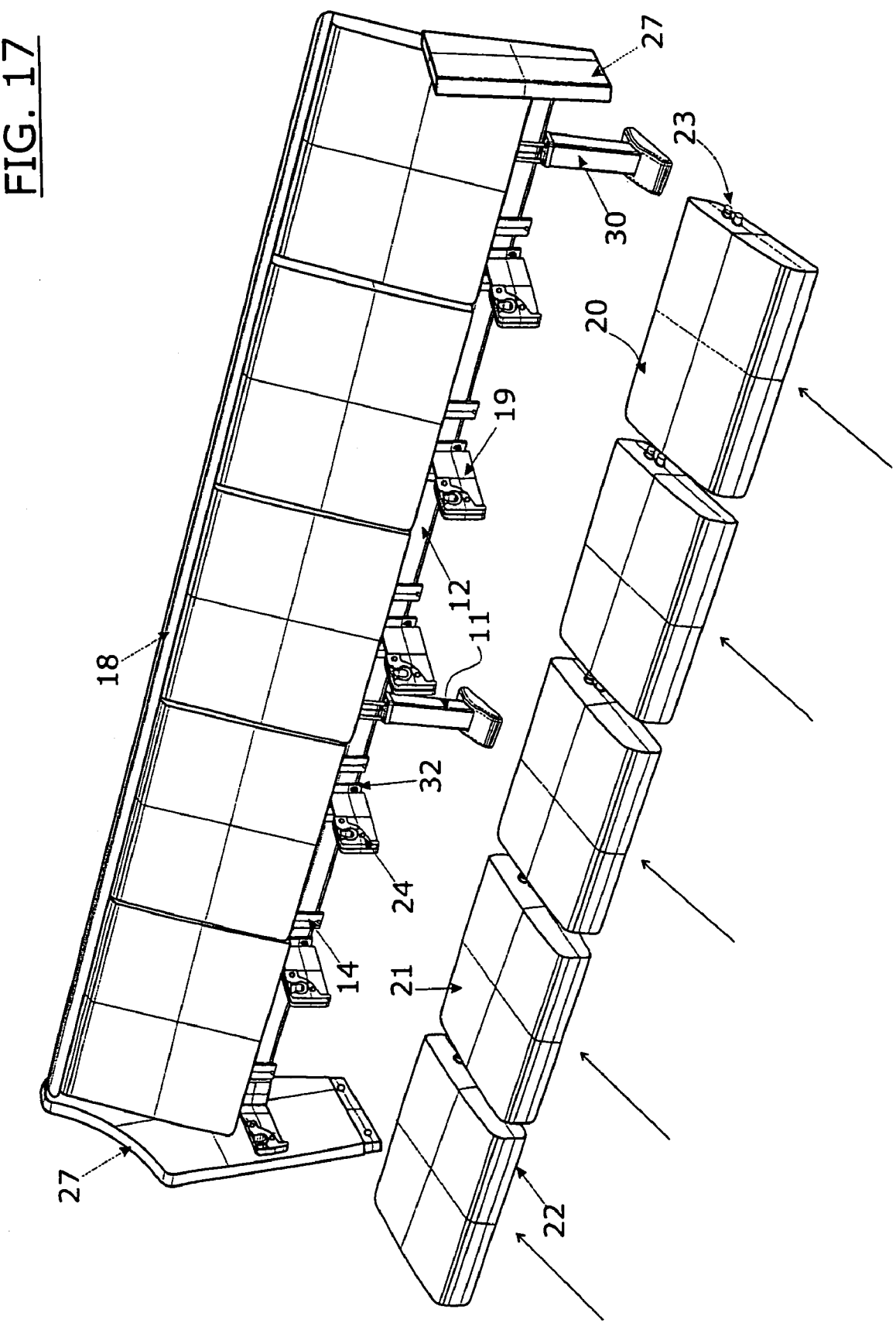

Finally, the selected seat bottom assemblies 20 are pivotably attached to the connector support 24 of the seat connection mechanisms 19. (FIG. 17). The seat bottom assemblies attach to the seat supports 24 of the seat connection mechanism 19. The seat bottom assemblies may be attached so that they are individually pivotable about an axis A going through the connector supports 24 of the seat connection mechanisms. The seat bottom assemblies 20 and the seat connector mechanism 19 may be configured so that the seat bottom assemblies are counter balanced and gravity self lifting. Preferably, pins 23 protruding from the seat support 21 are inserted into the inner pivot channel 25 of the seat support of the seat connection mechanisms 19 as shown in detail in FIG. 9.

The base members may be secured to the floor or to a riser in a step if the seating assembly is to be a permanent fixture. The base members may be bolted 42 permanently in place. However, the base members may also rest without being secured to the floor. The seating assembly may be moved from location to location without modifying or discarding existing seat components. The seating assembly may be reconstructed by simply adding additional seats and support beams to satisfy new row lengths.

More and more, large seating areas requiring cabling or wiring for to provide electrical or computer network access to those seated. This is especially true for classroom and certain auditorium uses. Often, the wiring or cabling is run along the floor and is unsightly and does not provide adequate access. The present invention provides for conduit 55 to be run parallel to the beam beneath the seats to enclose any necessary cabling or wiring. (FIG. 31). The conduit 55 could be hidden from plain view under the seats and also be provided with a cover 57 or opening along its length to provide adequate access to the wires or cables.

The present invention lends itself to ease and efficiency, not only in the assembly of the seating assemblies, but also in the ordering and specifying of seating. A purchaser of a seating assembly need only specify the desired row lengths and an average seat width and the necessary seating component based on the row lengths can be calculated. This lends itself to an automated means of ordering. A customer, through an electronic communication link, such as through an automated telephone system or through an internet website, could specify a desired row configuration to order.

Figure 28:
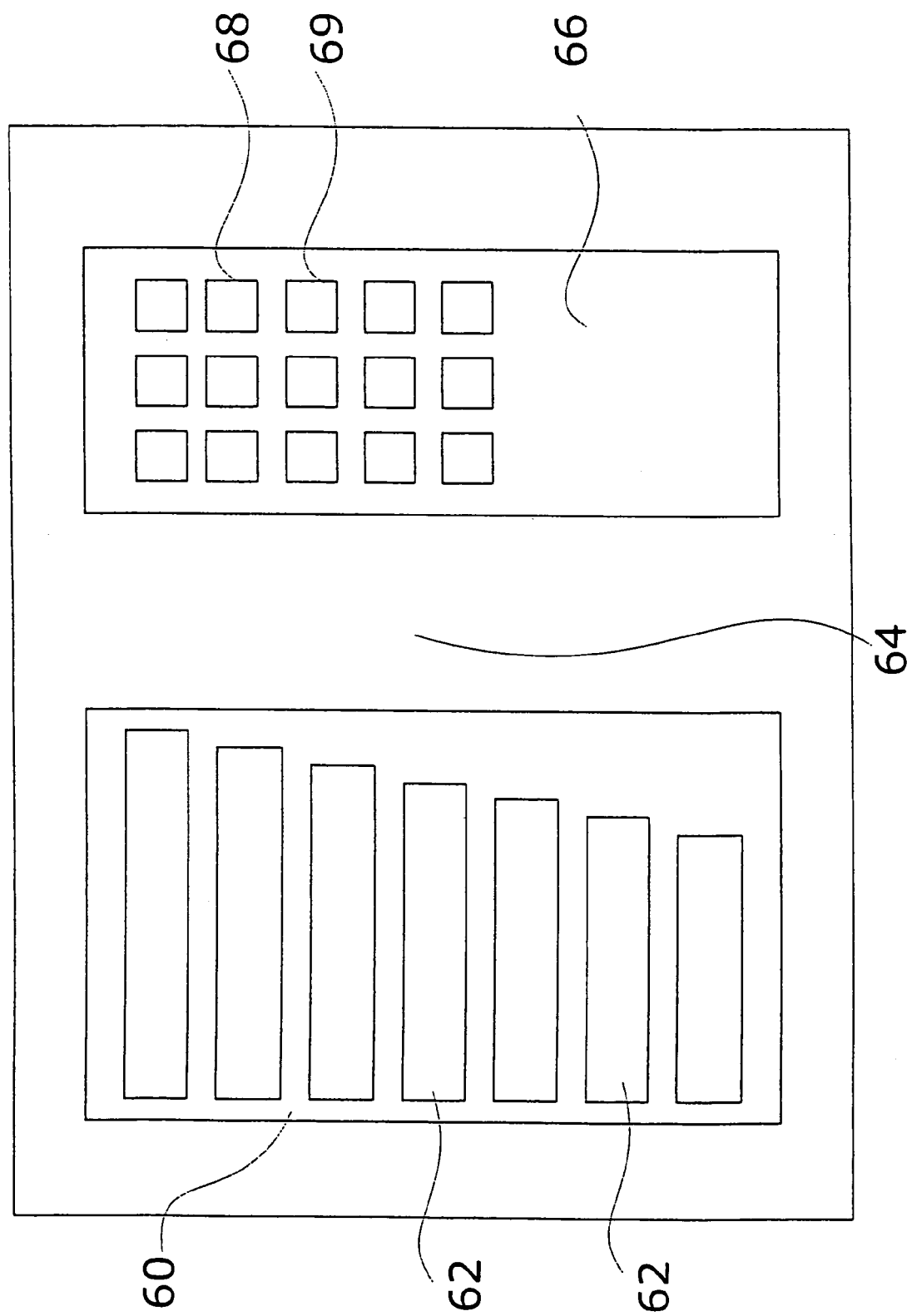
FIG. 28 is a screen shot of an automated system for ordering the seating assembly illustrated in FIG. 1.

FIG. 28 is a diagram of a computer screen shot illustrating a means of ordering the seating assembly described above. The ordering application may include a palette 66, where different seating component sizes 68 and styles 69 may be selected. A mouse cursor 64, allows a user to select different components and manipulate them within a work area 60 of the application. Lengths of the seating assemblies 62 may also be selected this way.

The present invention, through the modularity and standardization of components provides a simplified inventory of components. As described above, only a few standard size components are necessary to achieve a wide range of desires seating assembly lengths with little waste.

For instance, inventory of beams of standard lengths $L_1$, $L_2$, $L_3$ may be inventoried for a small number of optimal seat widths. Also, an appropriate range of seating component of varying widths may be inventoried for each optimal seat width chosen.

In addition to providing simplicity for a purchaser of the seating assembly, the benefits of the reduced inventory are enhanced by the automated selection process and computer executable algorithm.

As the desired row configurations are inputted during the automate selection process, a computer executable algorithm determines the appropriate number and length of standard and cut beam lengths which correspond to the desired row configuration the algorithm will also determine the number of seating components and corresponding seating component sizes and styles which correspond to the desired row configuration.

The inventoried standard components, which may also be linked to the system, are then removed from inventory and bundled per row specification. The standard beam lengths may be cut in the most efficient combinations as determined by the algorithm. Entire row assemblies may be bundled on individual skids for ease of ease of packing and transport, but more importantly for convenience and simplicity in assembly. The bundled materials are then shipped to a job site and assembled with greater ease and efficiency than if they had shipped packaged with like parts rather than with the corresponding row components.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A row of seating having a predetermined length, said row of seating comprising:
   a beam assembly comprising a plurality of beams aligned end to end, at least a first of the plurality of beams having a first standard length selected from a plurality of predefined standard length, and at least a second of the plurality of beams having a second standard length selected from the plurality of predefined standard lengths;
   wherein the first standard length is different than the second standard length;
   a plurality of supports supporting said beam assembly in a substantially horizontal position;
   a plurality of seating components attached to said beam assembly;
   wherein, said beam assembly is secured to said plurality of supports such that said beam assembly is positioned between a first and second plate and secured by screws passing outside the beam assembly connecting the first and second plates; and
   wherein, a said first plate of each of said plurality of supports is an upper plate and a said second plate of each of said plurality of supports is a lower plate and said beam assembly is positioned between the upper plate and the lower plate of each of said plurality of supports and screws extend from the upper plate to the lower plate to secure said beam assembly to said plurality of supports.

2. The row of seating of claim 1, wherein, said beam assembly has a substantially rectangular cross section and the first and second plates of each of said plurality of supports comprise a U-shaped bracket, an opening of the U-shaped bracket corresponding to a thickness of said beam assembly, and positioned such that the U-shaped bracket substantially surrounds said beam assembly on three sides.

3. A row of seating having a predetermined length, said row of seating comprising:
   a beam assembly comprising a plurality of beams aligned end to end, at least a first of the plurality of beams having a first standard length selected from a plurality of predefined standard lengths, and at least a second of the plurality of beams having a second standard length selected from the plurality of predefined standard length;
   wherein the first standard length is different than the second standard length;
   a plurality of support supporting said beam assembly in a substantially horizontal position;
   a plurality of seating components attached to said beam assembly;
   wherein said plurality of seating components comprises a plurality of seat assemblies having an optimal seat width; and
   wherein said first standard length and said second standard length comprise integer multiples of one half of the optimal seat width.

4. The row of seating of claim 3 wherein said first standard length and said second standard length comprise odd integer multiples of one half of the optimal seat width.

5. The row of seating of claim 3 wherein the plurality of beams further comprises at least one cut beam, and wherein a sum of lengths of the plurality of beams corresponds to the predetermined length of said row of seating.

6. The row of seating of claim 5, wherein the cut beam is cut from a beam having a length selected from the plurality of standard lengths, the cut beam having a length which comprises an integer multiple of one half of the optimal seat width.

7. The row of seating of claim 6, wherein the cut beam has a length which comprises an odd integer multiple of one half of the optimal seat width.

8. The row of seating of claim 5, wherein the cut beam is cut from a beam having a length selected from the plurality of standard lengths, the cut beam having a custom length such that the beam assembly reaches the predetermined length of said row of seating without requiring customization of all of the plurality of beams.

9. The row of seating of claim 8, wherein the cut beam is cut from a beam having the first standard length or the second standard length.

10. The row of seating of claim 3, wherein at least a third of the plurality of beams has a third standard length selected from the plurality of predefined standard lengths, and wherein the third standard length is different than the first standard length and the second standard length.

11. The row of seating of claim 3, wherein said plurality of seating components comprises a plurality of seat bottoms, and wherein said plurality of seat bottoms outnumber said plurality of supports.

12. The row of seating of claim 11, wherein each of said plurality of supports is positioned substantially beneath at least one of the plurality of seat bottoms.

13. The row of seating of claim 3, wherein at least some of said plurality of seat components are connected to said beam assembly by way of U-shaped brackets, each U-shaped bracket being fixedly secured to said beam assembly by screws passing through the U-shaped bracket and beside said beam assembly such that no holes are made in said beam assembly.

14. The row of seating of claim 13, wherein said plurality of seating components comprises a plurality of seat backs and a plurality of corresponding seat bottoms.

15. The row of seating of claim 3, further comprising a plurality of seat connectors connecting said plurality of seating components to said beam assembly, wherein each of the plurality of seat connectors comprises a substantially U-shaped bracket, an opening of the U-shaped bracket corresponding to the thickness of said beam assembly, and positioned such that the U-shaped bracket substantially surrounds said beam assembly on three sides.

16. The row of seating of claim 15, wherein said plurality of seating components comprise a plurality of separate seat bottoms and seat backs and wherein the plurality of seat bottoms are attached to said beam assembly through the plurality of seat connectors.

17. A row of seating having a predetermined row length, comprising:
   at least two beams from a plurality of beams having at least two predefined standard lengths aligned end to end to form a beam assembly such that the predetermined row length is reached;
   a plurality of supports supporting the beam assembly in a substantially horizontal position;

a plurality of seating components of a standard size comprising a plurality of seat bottoms;

a number of left seat connectors equal to the number of seat bottoms and a number of right seat connectors equal to the number of seat bottoms attached to the beam assembly such that a left seat connector is positioned to attach to a left side of a seat bottom and a right seat connector is positioned to attach to a right side of a seat bottom; and a distance between adjacent seat bottoms that is varied by shifting at least one of the left and right seat connectors along said beam assembly so that the row of seating reaches the predetermined length without requiring customization of the plurality of seating components.

18. A row of seating having a predetermined length, said row of seating comprising:

a beam assembly comprising a plurality of beams aligned end to end, at least a first of the plurality of beams having a first standard length selected from a plurality of predefined standard length, and at least a second of the plurality of beams having a second standard length selected from the plurality of predefined standard length;

wherein the first standard length is different than the second standard length;

a plurality of supports supporting said beam assembly in a substantially horizontal position;

a plurality of seating components attached to said beam assembly;

a plurality of seat connectors connecting said plurality of sealing components to said beam assembly, wherein each of the seat connectors comprises a substantially U-shaped bracket, an opening of the U-shaped bracket corresponding to the thickness of said beam assembly, and positioned such that the U-shaped bracket substantially surround said beam assembly on three sides; and wherein said plurality of seat connectors comprise a plurality of left and right seat connectors.

19. The row of seating of claim 18, wherein said plurality of left and right seat connectors are connected to said beam assembly and positioned such that a left seat connector attaches to the left side of a seat bottom and a right seat connector attaches to a right side of a seat bottom, defining a space between adjacent seat bottoms.

20. The row of seating of claim 19, wherein, said space between adjacent seat bottoms is adjusted by shifting at least one of the plurality of left and right seat connectors along said beam assembly so that the row of seating reaches a predetermined length without requiring customization of the plurality of seating components.

21. The row of seating of claim 19, wherein the plurality of seat connectors extend forward in a substantially horizontal position and a plurality of seat bottoms are pivotably attached to the plurality of seat connectors, each of the plurality of seat bottoms being separately pivotable about an axis through the plurality of seat connectors.

22. The row of seating of claim 21, wherein the plurality of seat connectors are configured such that the plurality of seat bottoms are gravity lifted.

23. The row of seating of claim 22, wherein each of the plurality of seat connectors comprises:

a saddle bracket portion comprising an inner pivot channel;
a pin portion comprising a pin protruding therefrom; and
wherein, when the pin portion is angled with respect to the saddle bracket portion at an insertion angle, the pin is insertable into and removable from the inner pivot channel, and such that when the pin portion is angled with respect to the saddle bracket portion at an angle other than the insertion angle, the pin is retained in the inner pivot channel.

24. A row of seating having a predetermined row length, comprising:

a beam assembly comprising at least two beams aligned end to end to reach the predetermined row length, said beam assembly having a substantially rectangular cross-section including a top side, a front side, a back side and a bottom side;

a plurality of supports supporting the beam assembly in a substantially horizontal position, each of said plurality of supports secured to at least one of a floor and a step riser;

a plurality of seating components comprising a plurality of seat bottoms and a plurality of seat backs;

a plurality of seat connectors connecting said plurality of seating components along said beam assembly, wherein each of the plurality of seat connectors comprises a substantially U-shaped bracket that substantially surrounds the top side, the front side, and the back side of said beam assembly;

a space between each adjacent seat bottom that is adjustable by shifting at least one of said seat connectors along said beam assembly so that the row of seating reaches the predetermined length without requiring customization of the plurality of seating components;

wherein each of said seat connectors includes a securing apparatus adjacent to at least the bottom side of said beam assembly securing each of the seat connectors about said beam assembly without requiring holes in said beam assembly; and wherein each of the plurality of seat bottoms are pivotably attached to at least one of said seat connectors and separately pivotable about an axis through the at least one seat connector.

25. The row of seating according to claim 24, wherein said plurality of supports have a substantially rectangular cross-section and connect to said beam assembly on at least the bottom side of said beam assembly.

26. The row of seating of claim 24, wherein said seating components comprise a plurality of arm rests.

27. The row of seating of claim 26, wherein at least some of the plurality of arm rests comprise a substantially U-shaped bracket, an opening of the U-shaped bracket corresponding to a thickness of said beam assembly, and positioned such that the U-shaped bracket substantially surrounds said beam assembly on three sides.

28. The row of seating of claim 26, wherein at least some of the plurality of arm rests are connected to said beam assembly by seating connectors, wherein each of the seating connectors comprises a substantially U-shaped bracket, an opening of the U-shaped bracket corresponding to a thickness of said beam assembly, and positioned such that the U-shaped bracket substantially surrounds said beam assembly on three sides.

29. The row of seating of claim 24, further comprising a conduit parallel to said beam assembly, said conduit providing a channel for and access to wiring for the seating row.

30. The row of seating according to claim 24, wherein the securing apparatus includes at least one of a plate and a bolt.

31. The row of seating according to claim 24, wherein at least one of said seat connectors include a spring loaded mechanism to lift one of said seat bottoms pivotably attached to the seat connector.

32. A seating arrangement comprising:
at least a first row of seating and a second row of seating, said first row of seating having a different length than said second row of seating;
wherein said first row of seating comprises a first plurality of beams aligned end to end and supported in a substantially horizontal position, at least one of the first plurality of beams having a first length and at least another of the first plurality of beams having a second length different than the first length a combined length of the first plurality of beams defining a length of said first row of seating;
wherein said second row of seating comprises a second plurality of beams aligned end to end and supported in a substantially horizontal position, at least one of the second plurality of beams having a third length and at least another of the second plurality of beams having a fourth length different than the third length, a combined length of the second plurality of beams defining a length of said second row of seating;
a first plurality of seats connected to the first plurality of beams, at least some of said first plurality of seats having a first standard width, a combined width of said first plurality of seats being generally equal to the length of said first row of seating; and
a second plurality of seats connected to the second plurality of beams, at least some of said second plurality of seats having a first standard width, a combined width of said second plurality of seats being generally equal to the length of said second row of seating.

33. The seating arrangement of claim 32, wherein the first length is the same as the third length and wherein the second length is the same as the fourth length.

34. The seating arrangement of claim 32, wherein at least some of the first plurality of seats and the second plurality of seats comprise a seat having a second standard width, selected from a group of standard widths, such that the combined width of said first plurality of seats is generally equal to the length of said first row of seating and the combined width of said second plurality of seats is generally equal to the length of said second row of seating without requiring custom width seats.

35. The seating arrangement of claim 32, wherein the first plurality of beams and the second plurality of beams have a substantially rectangular cross section and each of said first plurality of seats and said second plurality of seats comprises a substantially U-shaped bracket, an opening of the U-shaped bracket corresponding to a thickness of said first plurality of beams and said second plurality of beams, positioned such that the U-shaped bracket substantially surrounds the first plurality of beams or the second plurality of beams on three sides.

36. The seating arrangement of claim 32, further comprising a plurality of seat connectors connecting said first plurality of seats and said second plurality of seats to the first plurality of beams or the second plurality of beams, each of the plurality of seat connectors comprising a substantially U-shaped bracket, an opening of the U-shaped bracket corresponding to a thickness of the first plurality of beams and the second plurality of beams, positioned such that the U-shaped bracket substantially surrounds the first plurality of beams or the second plurality of beams on three sides.

37. The seating arrangement of claim 32, wherein said first plurality of seats and said second plurality of seats comprise a plurality of seat bottoms and a corresponding plurality of seat backs.

38. The seating arrangement of claim 37, further comprising a plurality of seat connectors connecting the plurality of seat bottoms to said first plurality of beams and said second plurality of beams.

39. The seating arrangement of claim 38, wherein the plurality of seat connectors extend forward in a substantially horizontal position and the plurality of seat bottoms are pivotably attached to the plurality of seat connectors, each of the plurality of seat bottoms being separately pivotable about an axis through the plurality of seat connectors.

40. The seating arrangement of claim 39, wherein the plurality of seat connectors are configured such that the plurality of seat bottoms are gravity lifted.

41. The seating arrangement of claim 40, wherein each of the plurality of seat connectors comprises:
a saddle bracket portion comprising an inner pivot channel;
a pin portion comprising a pin protruding therefrom; and
wherein, when the pin portion is angled with respect to the saddle bracket portion at an insertion angle, the pin is insertable into and removable from the inner pivot channel, and such that when the pin portion is angled with respect to the saddle bracket portion at an angle other than the insertion angle, the pin is retained in the inner pivot channel.

42. The seating arrangement of claim 32, wherein at least some of said first plurality of seats and said second plurality of seats are connected to the first plurality of beams or the second plurality of beams by way of U-shaped brackets, each U-shaped bracket being fixedly secured to the first plurality of beams or the second plurality of beams where the first plurality of beams or the second plurality of beams is substantially surrounded on three sides by the U-shaped bracket and the first plurality of beams or the second plurality of beams are secured within the U-shaped brackets with at least one screw which passes through the U-shaped bracket and beside the first plurality of beams or the second plurality of beams, such that no holes are made in the first plurality of beams or the second plurality of beams.

43. The seating arrangement of claim 32, wherein the first length, the second length, the third length and the fourth length are selected from a plurality of predefined standard lengths.

44. The seating arrangement of claim 43 wherein the first plurality of beams further comprises a first cut beam and wherein the second plurality of beams further comprises a second cut beam.

45. The seating arrangement of claim 44, wherein the first cut beam and the second cut beam are cut from beams having lengths selected from the plurality of predefined standard lengths.

46. The seating arrangement of claim 32, wherein the first length, the second length, the third length and the fourth length comprise integer multiples of one half of the first standard width of said first plurality of seats and said second plurality of seats.

47. The seating arrangement of claim 46, wherein the first length, the second length, the third length and the fourth length comprise odd integer multiples of one half of the first standard width of said first plurality of seats and said second plurality of seats.

* * * * *